United States Patent
Muthiah

(10) Patent No.: US 11,625,192 B2
(45) Date of Patent: Apr. 11, 2023

(54) PEER STORAGE COMPUTE SHARING USING MEMORY BUFFER

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/908,035

(22) Filed: Jun. 22, 2020

(65) Prior Publication Data

US 2021/0397373 A1  Dec. 23, 2021

(51) Int. Cl.
*G06F 3/06* (2006.01)
*G06F 9/48* (2006.01)

(52) U.S. Cl.
CPC .......... *G06F 3/0659* (2013.01); *G06F 3/0604* (2013.01); *G06F 3/067* (2013.01); *G06F 3/0656* (2013.01); *G06F 9/485* (2013.01)

(58) Field of Classification Search
CPC ........ G06F 3/059; G06F 3/0604; G06F 9/485; G06F 3/067; G06F 3/0656
See application file for complete search history.

(56) References Cited

U.S. PATENT DOCUMENTS

| | | | |
|---|---|---|---|
| 6,434,594 B1* | 8/2002 | Wesemann | G06F 9/5055 709/201 |
| 10,853,744 B2* | 12/2020 | Biewald | G06Q 10/0631 |
| 2004/0098447 A1* | 5/2004 | Verbeke | G06F 9/5055 709/201 |
| 2004/0163085 A1* | 8/2004 | Dillenberger | G06F 9/505 718/105 |
| 2011/0320759 A1* | 12/2011 | Craddock | G06F 12/1081 710/308 |
| 2017/0124021 A1* | 5/2017 | Brown | H04L 67/1091 |
| 2019/0044883 A1* | 2/2019 | Jurski | G06F 9/5072 |
| 2019/0166221 A1* | 5/2019 | Shimamura | G06F 9/5072 |
| 2020/0401458 A1* | 12/2020 | Roy | G06F 9/5066 |

OTHER PUBLICATIONS

Gibb, S., Computational Storage over NVMe, FPGAs and Accelerating StorageWorkloads, 2018, Presentation at NVMe Developer Days, San Diego, CA (18 pages).
Bates, S., Accelerating Computational Storage Over NVMe with RISC-V, Presentation by Stephen Bates at Eideticomom, Dec. 4, 2018, (13 pages), https://www.youtube.com/watch?v=LDOIqgUZtHE.

* cited by examiner

*Primary Examiner* — Mark A Giardino, Jr.
(74) *Attorney, Agent, or Firm* — Patent Law Works LLP

(57) ABSTRACT

Example storage systems, storage devices, and methods provide sharing of data function processing using a memory buffer to coordinate between peer storage devices. A peer storage device acts as master to determine a plurality of compute tasks associated with a host function, determine peer storage devices and assign them compute tasks, and store the task compute configuration for each compute task in the buffer memory for access by the peer storage devices. Results of the peer compute tasks may be returned to the host.

20 Claims, 10 Drawing Sheets

PEER STORAGE COMPUTE SHARING USING MEMORY BUFFER

TECHNICAL FIELD

The present disclosure generally relates to data storage, and in a more particular example, to processing data functions across storage nodes.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

These large-scale storage systems may support the processing of stored data within storage nodes and/or storage devices to support applications, such as video encoding and decoding, machine learning, etc. The compute tasks that make up such processing may be distributed across storage nodes to limit the amount of data that needs to be transferred to a host system and/or conserve other host system resources. In some configurations, when a storage device receives a compute request, the storage device executes the compute request using only its own resources. The host computer may bear the burden of assuring there are no dependencies for the storage device to be able to perform the compute task, as well as managing the breakup and distribution of compute tasks. For example, the host may oversee the distributed computing by segregating a larger processing tasks into atomic compute tasks, assigning them to multiple devices, and receiving and post-processing the results. This may lead to significant overhead for the hosts.

Some distributed storage systems may be configured with storage nodes that include storage devices capable of peer-to-peer communication. For example, some storage systems may use network fabric interconnects and protocols to enable communication among storage devices and/or remote direct memory access from one storage device to another. These systems may include fabric interfaces and/or controllers that themselves include additional compute and memory resources. In some configurations, storage devices may be configured with controller memory buffer space that enables the transfer of command parameters independent of storage buffers used for the transfer of host data. Use of storage device controller memory buffer space may not impact host systems and preserve host memory and compute resources for other tasks.

As large-scale storage systems scale, transfer of large data sets for data operations may be inefficient. A need exists for at least storage systems that execute data functions, such as map-reduce functions, with reduced data transfers and improved efficiency and reliability.

SUMMARY

Various aspects for data function processing by storage systems, particularly, map-reduce and similar functions executed by the storage nodes are described.

One general aspect includes a storage device that includes: a storage medium; a remotely accessible buffer memory configured for access by a plurality of peer storage devices over a network fabric; and a processor coupled to the storage medium and the remotely accessible buffer memory. The processor is configured to: determine a plurality of compute tasks associated with a remotely issued host function; determine a target peer storage device from the plurality of peer storage devices; assign a peer compute task from the plurality of compute tasks to the target peer storage device; and store a task compute configuration in the remotely accessible buffer memory for access by the target peer storage device, where the target peer storage device is configured to process task input data using the task compute configuration and return task output data.

Implementations may include one or more of the following features. The processor may be further configured to store the task input data in the remotely accessible buffer memory for access by the target peer storage device. The processor may be further configured to: receive, from the target peer storage device, the task output data in the remotely accessible buffer memory; and determine a host function result based on the task output data. The target peer storage device may be a first target peer storage device from the plurality of peer storage devices, the peer compute task may be a first peer compute task in a first set of parallel tasks from the plurality of compute tasks associated with the remotely issued host function, the task compute configuration may include a first task compute configuration associated with the first peer compute task, the task input data may include first task input data associated with the first peer compute task, and the task output data may include first task output data associated with the first peer compute task. The processor may be further configured to: determine the first set of parallel tasks; determine a second set of parallel tasks from the plurality of compute tasks associated with the remotely issued host function; determine a second target peer storage device from the plurality of peer storage devices; assign a second peer compute task in the second set of parallel tasks to the second target peer storage device; and store a second task compute configuration associated with the second peer compute task in the remotely accessible buffer memory for access by the second target peer storage device. The second target peer storage device may be configured to: process second task input data using the second task compute configuration; execute the second set of parallel tasks in parallel with the first target peer storage device executing the first set of parallel tasks; and return second task output data. The processor may be further configured to: receive, from the first target peer storage device, the first task output data in the remotely accessible buffer memory; receive, from the second target peer storage device, the second task output in the remotely accessible buffer memory; and determine, based on the first task output and the second task output, a host function result. The processor may be further configured to: determine a first set of parallel tasks that includes the peer compute task; determine a second set of parallel tasks from the plurality of compute tasks associated with the remotely issued host function; determine a second task compute configuration for a second compute task in the second set of parallel tasks; process second task input data using the second task compute configuration; execute the second set of parallel tasks in parallel with the target peer storage device executing the first set of parallel tasks; store the second task output data; receive, from the target peer storage device, the first task output data in the remotely accessible buffer memory; and determine, based on the first task output data and second task output data associated with the second compute task, a host function result. The peer compute task may be a first peer compute task in a first set of sequential tasks from the plurality of compute tasks associated with the host function and the processor may be further configured to: determine the first set of sequential tasks; determine a second set of sequential tasks from the plurality of compute tasks associated with the remotely issued host function; receive, from the target peer storage device, the first task output data in the remotely accessible buffer memory; assign a second peer compute task in the second set of sequential tasks to the target peer storage device; store a second task compute configuration associated with the second peer compute task in the remotely accessible buffer memory for access by the target peer storage device; receive, from the target peer storage device, second task output data in the remotely accessible buffer memory; and determine, based on the second task output data, a host function result. The target peer storage device may be further configured to: process, after returning the first task output data, second task input data using the second task compute configuration; and return second task output data. The processor may be further configured to: assign at least one peer compute task of the plurality of peer compute tasks to each peer storage device of a number of peer storage devices in the plurality of peer storage devices; and allocate, in the remotely accessible buffer memory, a peer compute task space for each peer storage device of the number of peer storage devices. Each peer compute task space may be configured to include at least one compute task configuration space. Each peer compute task space may be further configured to include at least one input data space and at least one output data space. The storage medium may include a non-volatile memory device for a first solid-state drive. The remotely accessible buffer memory may be at least a portion of a command memory buffer that is not allocated for host storage data transfer. The target peer storage device may include a non-volatile memory device for a second solid-state drive and be further configured to store intermediate results of the peer compute task on the non-volatile memory device for the second solid-state drive. The storage device is configured to return, to a host system, a host function result based on the task output data.

Another general aspect includes a computer-based method that includes: receiving, from a host system, a remotely issued host function request; determining a plurality of compute tasks associated with the remotely issued host function request; determining a target peer storage device from a plurality of peer storage devices configured for peer communication over a network fabric; assigning a peer compute task from the plurality of compute tasks to the target peer storage device; storing a task compute configuration in a remotely accessible buffer memory for access by the target peer storage device; processing, by the target peer storage device, task input data using the task compute configuration; receiving, from the target peer storage device, task output data; determining, based on the task output data, a host function result; and returning, to the host system, the host function result.

Implementations may include one or more of the following features. The computer-based method may include: storing the task input data in the remotely accessible buffer memory for access by the target peer storage device. The computer-based method may include: storing, by the target peer storage device, the task output data in the remotely accessible buffer memory. The target peer storage device may be a first target peer storage device from the plurality of peer storage devices. The peer compute task may be a first peer compute task in a first set of parallel tasks from the plurality of compute tasks associated with the remotely issued host function request. The task compute configuration may include a first task compute configuration associated with the first peer compute task. The task input data may include first task input data associated with the first peer compute task. The task output data may include first task output data associated with the first peer compute task. Determining the host function result may be further based on second task output data. The computer-based method may include: determining the first set of parallel tasks; determining a second set of parallel tasks from the plurality of compute tasks associated with the remotely issued host function request; determining a second target peer storage device from the plurality of peer storage devices; assigning a second peer compute task in the second set of parallel tasks to the second target peer storage device; storing a second task compute configuration associated with the second peer compute task in the remotely accessible buffer memory for access by the second target peer storage device; processing, by the second target peer storage device, second task input data using the second task compute configuration; and receiving, from the second target peer storage device, the second task output data. The computer-based method may include: storing, in the remotely accessible buffer memory for access by the first target peer storage device, the first input data; storing, in the remotely accessible buffer memory for access by the second target peer storage device, the second input data; receiving, from the first target peer storage device, the first task output data in the remotely accessible buffer memory; and receiving, from the second target peer storage device, the second task output in the remotely accessible buffer memory. The computer-based method may include: determining a first set of parallel tasks that includes the peer compute task; determining a second set of parallel tasks from the plurality of compute tasks associated with the remotely issued host function request; determining a second task compute configuration for a second compute task in the second set of parallel tasks; determining, based on second task input data and the second task compute configuration, the second task output data in parallel with the target peer storage device processing the first task input data; and receiving, from the target peer storage device, the first task output data in the remotely accessible buffer memory. The peer compute task may be a first peer compute task in a first set of sequential tasks from the plurality of compute tasks associated with the remotely issued host function request. The computer-based method may include: determining the first set of sequential tasks; determining a second set of sequential tasks from the plurality of compute tasks associated with the remotely issued host function request; receiving, from the target peer storage device, the first task output data in the remotely accessible buffer memory; assigning a second peer compute task in the second set of sequential tasks to the target peer storage device; storing a second task compute configuration associated with the second peer compute task in the remotely accessible buffer memory for access by the target peer storage device; processing, by the target peer storage device and after returning the first task output data, second task input data using the second task compute configuration; and receiving, from the target peer storage device, second task output data in the remotely accessible buffer memory. The computer-based method may include: assigning at least one peer compute task of the plurality of peer compute tasks to each peer storage device of a number of peer storage devices in the plurality of peer storage devices; and allocating, in the remotely accessible buffer memory, a peer compute task space for each peer storage device of the number of peer storage devices. Each peer compute task space may be configured to include at least one compute task configuration space. Each peer compute task space may be further configured to include at least one input data space and at least one output data space.

Still another general aspect includes a system that includes: a first storage device including a remotely accessible buffer memory configured for access by a plurality of peer storage devices over a network fabric; means for receiving, from a host system, a remotely issued host function request; means for determining a plurality of compute tasks associated with the remotely issued host function request; means for determining, by the first storage device, a target peer storage device from the plurality of peer storage devices; means for assigning, by the first storage device, a peer compute task from the plurality of compute tasks to the target peer storage device; means for storing, by the first storage device, a task compute configuration in a remotely accessible buffer memory for access by the target peer storage device; means for processing, by the target peer storage device, task input data using the task compute configuration; means for receiving, from the target peer storage device, task output data; means for determining, based on the task output data, a host function result; and means for returning, to the host system, the host function result.

The various embodiments advantageously apply the teachings of distributed storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve the efficient processing of data functions be executing those functions using distributed peer storage devices coordinated using the buffer memory of a master storage device. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
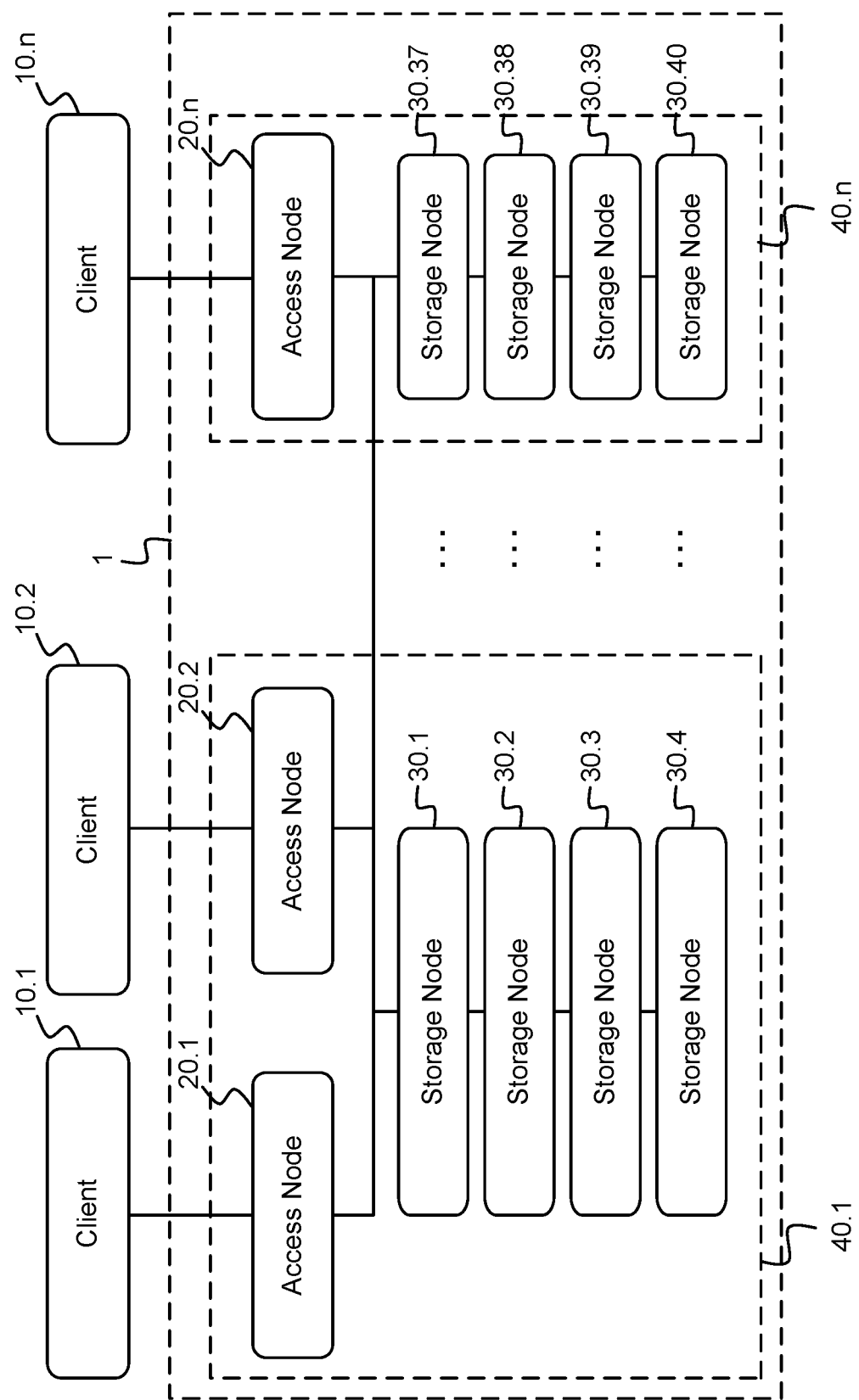
FIG. 1 schematically illustrates an example of a distributed storage system.

FIG. 1 shows an embodiment of an example distributed storage system 1. In some embodiments, the distributed storage system 1 may be implemented as a distributed object storage system which is coupled to one or more clients 10.1-10.$n$ for accessing data objects through one or more controller or access nodes 20.1-10.$n$. The connection between the distributed storage system 1 and clients 10 could, for example, be implemented as a suitable data communication network. Clients 10 may host or interface with one or more applications that use data stored in distributed storage system 1. Such an application could, for example, be a dedicated software application running on a client computing device, such as a personal computer, a laptop, a wireless telephone, a personal digital assistant or any other type of communication device that is able to interface directly with the distributed storage system 1. However, according to alternative embodiments, the applications could, for example, comprise a suitable file system which enables a general purpose software application to interface with the distributed storage system 1, an application programming interface (API) library for the distributed storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

As further shown in FIG. 1, the distributed storage system 1 comprises a plurality of controller or access nodes 20 and a plurality of storage nodes 30 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Access nodes 20, storage nodes 30 and the computing devices comprising clients 10 may connect to the data communication network by means of suitable wired, wireless, optical, etc. network connections or any suitable combination of such network connections. Although the embodiment of FIG. 1 shows only three access nodes 20 and forty storage nodes 30, according to alternative embodiments the distributed storage system 1 could comprise any other suitable number of storage nodes 30 and, for example, two, three or more access nodes 20 coupled to these storage nodes 30.

These access nodes 20 and storage nodes 30 may be built as general-purpose computers. Alternatively, they may be physically adapted for arrangement in large data centers, where they are arranged in modular racks 40.1-40.$n$ comprising standard dimensions. Exemplary access nodes 20 and storage nodes 30 may be dimensioned to take up a single unit of such racks 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces. An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30. In some embodiments, HTTP/REST protocols complying with the Amazon Simple Storage Service (S3) object storage service may enable data transfer through a REST application protocol interfaces (API). Such access nodes 20 may operate as a highly available cluster of controller nodes with one or more integrated and/or independent interface systems, and provide for example shared access to the storage nodes 30, metadata caching, protection of metadata, etc.

In some embodiments, clients 10, access nodes 20, and/or storage nodes 30 may be interconnected using one or more network fabric protocols and related physical and logical network interface. For example, storage nodes may include non-volatile memory express (NVMe) compliant storage devices, such as solid-state drives (SSD) connected via peripheral component interconnect express (PCIe) physical interfaces. Storage nodes 30 may include NVMe interface controllers to connect to a wider network infrastructure, such as a Fibre Channel or Ethernet network that supports NVMe traffic.

As shown in FIG. 1 several storage nodes 30 can be grouped together, for example because they are housed in a single rack 40. For example, storage nodes 30.1-30.4 and 30.37-30.40 each are respectively grouped into racks 40.1 and 40.*n*. Access nodes 20 may be located in the same or different racks as the storage nodes to which the access nodes connect. A rack may have multiple access nodes, for example rack 40.1, a single access node as rack 40.*n*, or no access nodes (not shown) and rely on an access node in another rack or storage nodes or clients with built-in access node and/or controller node capabilities. These racks are not required to be located at the same location. They are often geographically dispersed across different data centers, for example, rack 40.1 can be located at a data center in Europe and 40.*n* at a data center in the USA.

Figure 2:
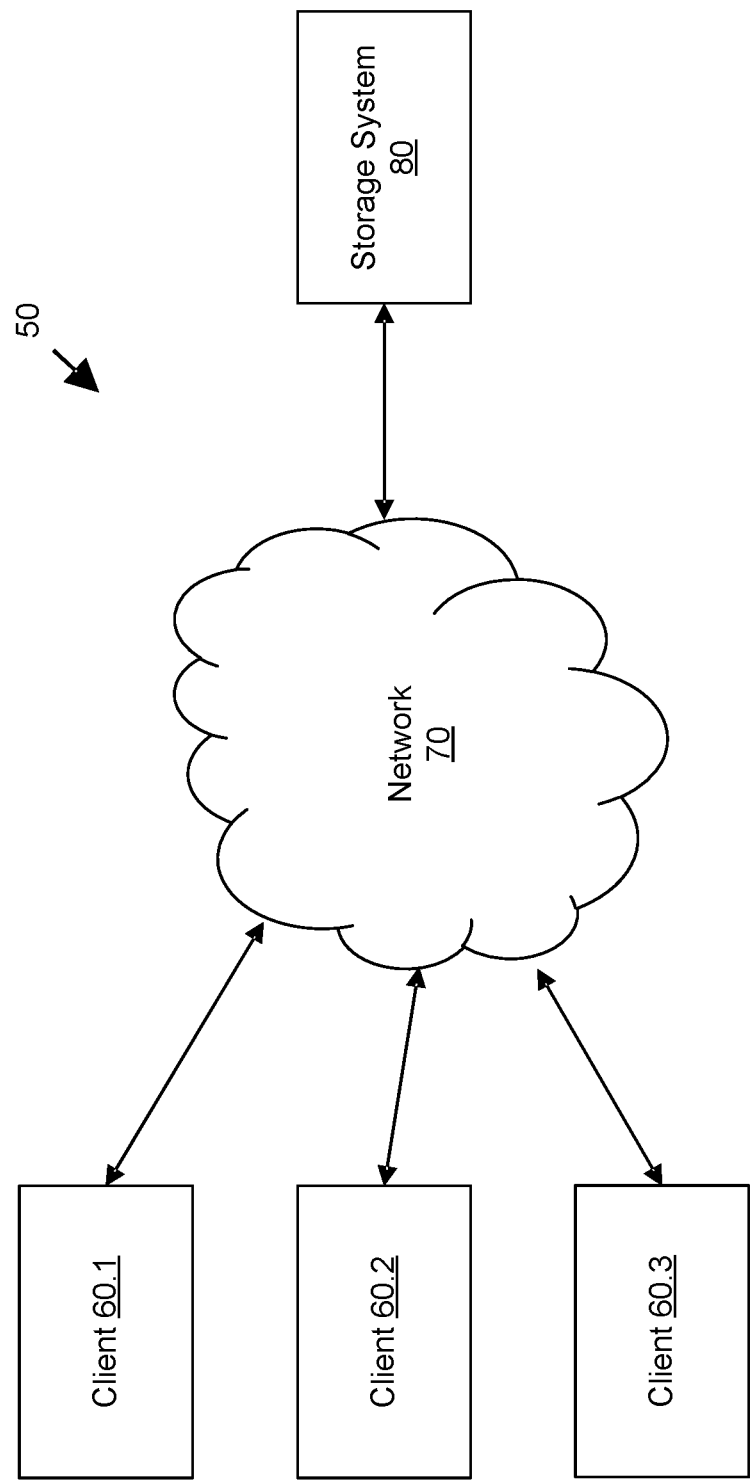
FIG. 2 schematically illustrates an example client architecture in which the distributed storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
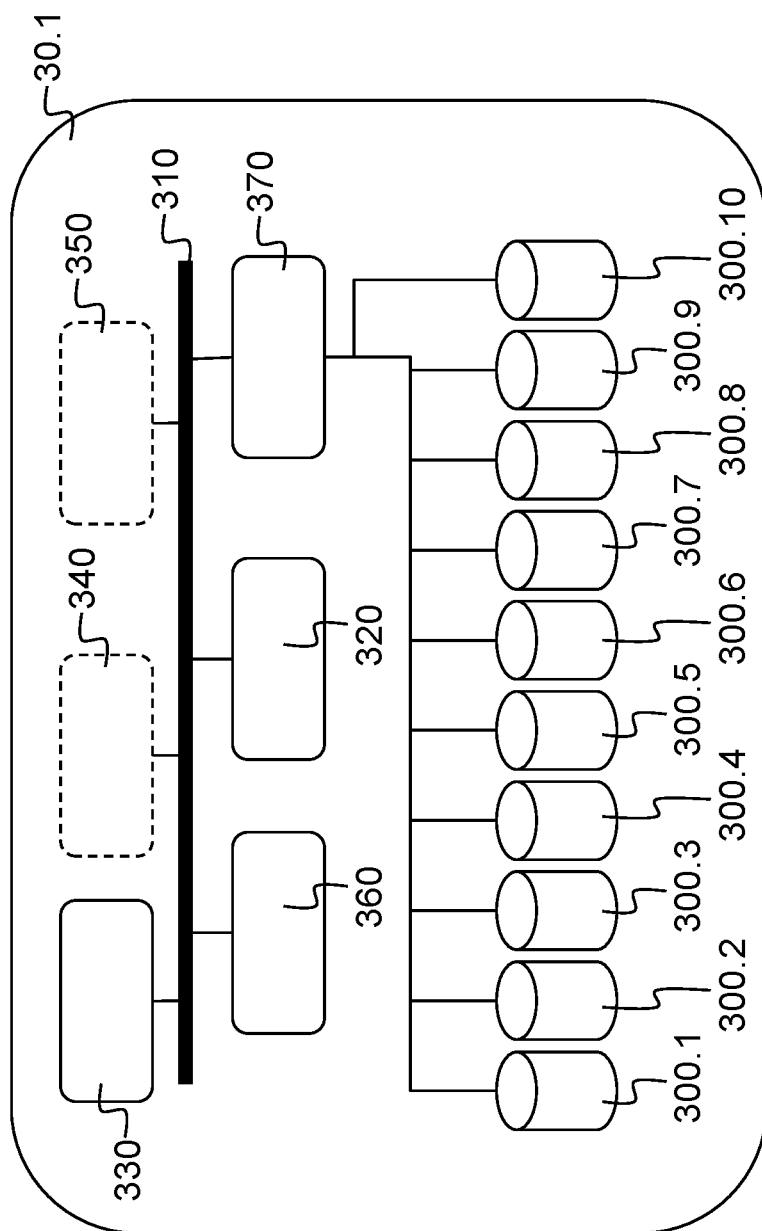
FIG. 3 schematically illustrates an example of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or access nodes 20 such as for example two 1 gigabit (Gb) Ethernet interfaces.

Storage element interface 370 may comprise a storage interface, for example a SATA interface, a small computer system interface (SCSI), or a PCIe/NVMe interface for connecting bus 310 to one or more storage elements 300, such as one or more local disks, for example, 6 terabyte (TB) SATA disk drives, or 2 TB NVMe SSDs, and control the reading and writing of data to/from these storage elements 300. In one exemplary embodiment as shown in FIG. 3, such a storage node 30.1 could comprise ten 6 TB SATA disk drives as storage elements 300.1-300.10 and in this way storage node 30.1 would provide a storage capacity of 60 TB to the distributed storage system 1. According to the exemplary embodiment of FIG. 1 and in the event that storage nodes 30.2-30.40 are identical to storage node 30.1 and each comprise a storage capacity of 60 TB, the distributed storage system 1 would then have a total storage capacity of 2400 TB. Similarly, storage node 30.1 could comprise ten 2 TB SSDs as storage elements 300.1-300.10 and provide 20 TB to distributed storage system 1, resulting in a total storage capacity of 800 TB. In some configuration, distributed storage system 1 may include a mix of storage nodes with different configurations of SSDs and HDDs of varying capacities.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 3 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system to store and retrieve a data object comprising data (e.g. 64 megabytes (MB) of binary data) and a data object identifier for addressing this data object, for example, a universally unique identifier such as a globally unique identifier (GUID). Embodiments of the distributed storage system 1 may operate as a distributed object storage system. Storing the data offered for storage by the application in the form of a data object, also referred to as object storage, may have specific advantages over other storage schemes such as block-based storage or file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disc spindle rotation to be synchronised. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system.

Figure 4:
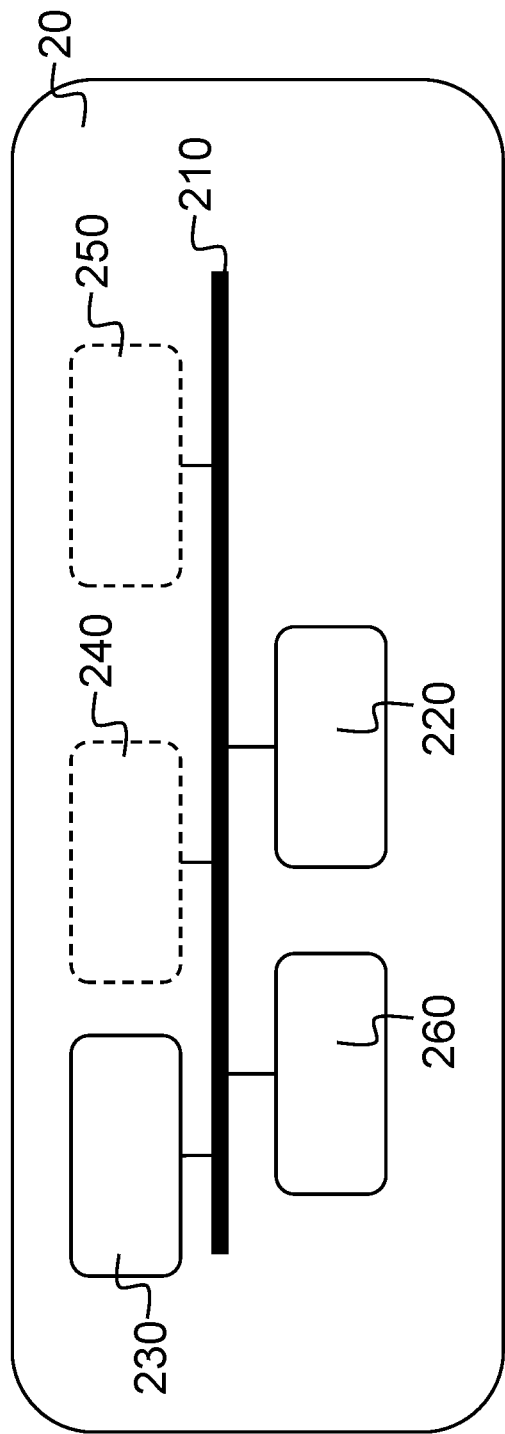
FIG. 4 schematically illustrates an example of a controller node or access node of the distributed storage system of FIG. 1.

FIG. 4 shows a schematic representation of an embodiment of the controller or access node 20. Access node 20 may include storage controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250. In some embodiments, access node 20 may include object storage management functions, including object storage interface functions, version control management, and/or replication engines.

Bus 210 may include one or more conductors that permit communication among the components of access node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the access node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables access node 20 to communicate with other devices and/or systems, for example mechanisms for communicating with other storage nodes 30 or access nodes 20 such as for example two 10 Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
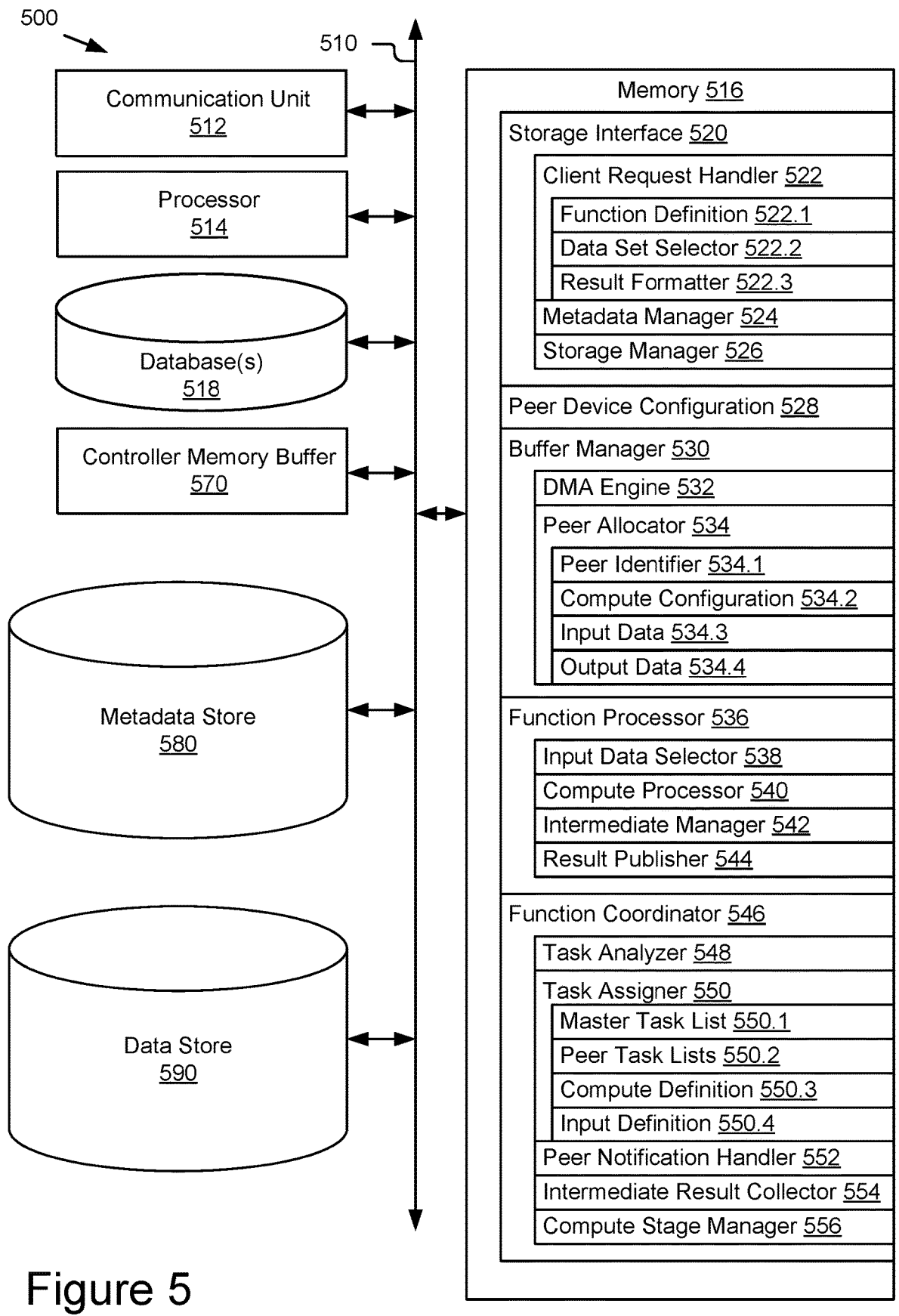
FIG. 5 schematically illustrates some example elements of a storage system for the distributed storage system of FIG. 1.

FIG. 5 schematically shows selected modules of a storage node and/or one or more storage devices contained therein. Storage system 500 may incorporate elements and configurations similar to those shown in FIGS. 1-4. For example, storage system 500 may include one or more storage nodes 30 configured with the modules shown. In some embodiments, one or more of the modules shown may be hosted on one or more storage devices within storage nodes 30, such as storage devices with peer communication capabilities. For example, each storage device may include peer device configuration 528, buffer manager 530, and/or function processor 536, and one or more storage devices may include function coordinator 546 for acting as a master storage device for host function processing. Similarly, each storage device may include their own communication unit 512, processor 514, memory 516, and controller memory buffer 570, while database(s) 518, metadata store 580, and data store 590 may represent one or more individual, distributed, and/or collective data stores for storing and managing host or client data in the storage media of the storage devices.

Storage system 500 may include a bus 510 interconnecting at least one communication unit 512, at least one processor 514, and at least one memory 516. Bus 510 may include one or more conductors that permit communication among the components of access system 500. Communication unit 512 may include any transceiver-like mechanism that enables access system 500 to communicate with other devices and/or systems. For example, communication unit 512 may include wired or wireless mechanisms for communicating with file system clients, other access systems, and/or one or more object storage systems or components, such as storage nodes or controller nodes. In some embodiments, communication unit 512 may enable communication among fabric nodes in a storage network fabric and host systems, access nodes, storage nodes, and/or subcomponents thereof, such as storage devices, may be configured as fabric nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disk or a solid state storage element.

Storage system 500 may include or have access to one or more databases and/or specialized data stores, such metadata store 580 and data store 590. Databases may include one or more data structures for storing, retrieving, indexing, searching, filtering, etc. of structured and/or unstructured data elements. In some embodiments, metadata store 580 may be structured as reference data entries and/or data fields indexed by metadata key value entries related to data objects stores in data store 590. Data store 590 may include data objects comprised of object data (such as host data), some amount of metadata (stored as metadata tags), and a GUID. Metadata store 580, data store 590, and/or other databases or data structures may be maintained and managed in separate computing systems, such as storage nodes, controller nodes, or access nodes, with separate communication, processor, memory, and other computing resources and accessed by storage system 500 through data access protocols. Metadata store 580 and data store 590 may be shared across multiple storage systems 500.

Storage system 500 may include a plurality of modules or subsystems that are stored and/or instantiated in memory 516 for execution by processor 514. For example, memory 516 may include a storage interface 520 configured to receive, process, and respond to data requests and/or data operation or function commands from client systems or other nodes in distributed storage system 1. Memory 516 may include a peer device configuration 528 configured to receive, manage, and store parameters related to peer storage devices in one or more peer groups that may directly access memory or storage resources between peer storage devices in the peer group. Memory 516 may include a buffer manager 530 for managing controller memory buffer 570 and/or other buffer memories in the storage devices and/or other fabric nodes. Memory 516 may include a function processor 536 for processing compute tasks related to data operations or functions received from a client or host system, such as performing a compute tasks assigned by a master storage device for shared processing. Memory 516 may include a function coordinator 546 for coordinating data function or operation processing among a plurality of storage nodes and/or the peer storage devices they contain.

Storage interface 520 may include an interface protocol or set of functions and parameters for storing, reading, and otherwise managing data requests to data store 590. For example, storage interface 520 may include functions for reading, writing, modifying, or otherwise manipulating data objects and/or files, as well as their respective client or host data and metadata in accordance with the protocols of an object or file storage system. In some embodiments, storage interface 520 may further enable execution of data operations for data store 590 and/or metadata store 580. For example, storage interface 520 may include protocols and/or interfaces for receiving data function requests that may include defining functions, target data sets, and/or result formatting and delivery, as well as executing those functions against data store 590.

In some embodiments, storage interface 520 may include a plurality of hardware and/or software modules configured to use processor 514 and memory 516 to handle or manage defined operations of storage interface 520. For example, storage interface 520 may include a client request handler 522, a metadata manager 524, and a storage manager 526. For any given client request, storage interface 520 may receive a client request through client request handler 522 and determine one or more operations based on the content of the request. These operations may include metadata operations handled by metadata manager 524 and/or object data operations handled by storage manager 526, including encoding and decoding operations. In some embodiments, data processing operations may be handled by storage interface 520 by calling one or more other modules, such as function processor 536 and/or function coordinator 546. The results of these operations may be processed, formatted, and returned by client request handler 522.

Client request handler 522 may include an interface and/or communication event-based condition for receiving data requests and/or operational commands from one or more clients. For example, client systems may send an object data request over a network connection and addressed to storage system 500 or a port or component thereof. Client request handler 522 may receive these requests and parse them according to the appropriate communication and storage protocols. For example, client request handler 522 may identify a transaction identifier, a client identifier, an object identifier (object name or GUID), a data operation, and additional parameters for the data operation, if any, from the received message or messages that make up the object data request. Similarly, operational commands may include syntax and parameters for accessing data stored according to a specific file system. Operational commands may also relate to the execution of data functions by storage system 500.

In some embodiments, client request handler 522 may be configured for managing data operations to be executed by storage system 500. For example, a client or host system may be able to define one or more data functions to be executed against a data set stored in data store 590 without transferring the data set to the client system (i.e., executing the host function on the data in the storage nodes and only transferring the results to the client system). In some embodiments, data previously stored in data store 590 may be processed through at least one function (in a set of functions) by the storage node and/or storage device storing the target data blocks. For some host function request, an intermediate context may be returned for further processing, such as by another peer storage device acting as master for coordinating the process or another peer storage device for a subsequent stage of processing (using the same function or another function in the set).

Client request handler 522 may include one or more operations for managing data operation requests from a client system. For example, upon receiving a function request or command that relates to a data operation, client request handler 522 may identify the management operation and/or parse the components of a complete data function operation. In some embodiments, a complete data operation request may include request parameters for a function definition, a target data set, and a result format. Client request handler 522 may include a function definition module 522.1, a data set selector 522.2, and/or a result formatter 522.3 for identifying, determining, or otherwise parsing the parameters of the data operation request. In some embodiments, the request parameters may be passed to function coordinator 546 for managing the sharing of compute tasks related to the function request.

In some embodiments, function definition module 522.1 may include an interface, function, or logic to receive and/or determine the set of functions to be used in a set of compute tasks for the data function operation. For example, the set of functions may include a function or set of parameters that may be applied to a subunit identification function for identifying data subunits. Example subunit identification functions might include logic for identifying sentences within a block of text, a frame of data within a video image file, or a shape within a graphics file. In some embodiments, a subunit identification function may include a set of subunit parameters that define the portions of a data unit that should be treated as a subunit for the purposes of the set of functions. The set of functions may include a map-function, which may provide logic for operating on a subunit to determine an intermediate context for that subunit. For example, the map-function may count the nouns in a sentence, the faces in a frame of video, or the vertices in a shape and return a numeric value or type-value pair for each parameter of the subunit being determined by the map-function. A map-function may be a parallel-function that allows each subunit to be processed independently or a serial-function where each intermediate context provides one or more values for use in applying the serial-function to the next subunit. The set of functions may include a reduce-function, which provides logic for providing an aggregate or result value for the intermediate contexts determined for each subunit. The set of functions may also include terminal conditions, such as values or parameters to seed another function (e.g., a map or reduce function) or conditions signalling a final subunit and a result-function. In some embodiments, function definition module 522.1 may include an API or user interface for receiving selections of function types and parameters and may be sent from a client system.

In some embodiments, data set selector 522.2 may include an interface, function, or logic to receive and/or determine target data set to be processed using the set of functions for a particular data operation. For example, data set selector 522.2 may define the bounds of a set of data using any physical or logical grouping appropriate to the particular set of functions. Data set selector 522.2 may be configured for the type of data stored in data store 590 and/or the metadata from metadata store 580 that may be used to index the data. For example, data set selector 522.2 may be able to target a data object, set of data objects defined by some selection criteria, a bucket or other logical volume, or a similar set of parameters for defining data of interest. As another example, data set selector 522.2 may be able to target a data file, a set of data files defined by some selection criteria, an inode or other logical volume, or a similar set of parameters for defining data of interest. As still another example, data selector 522.2 may be able to target a physical storage location using a starting address and ending address, starting address and length, or similar boundary conditions that map to physical addresses or their contents. In some embodiments and/or for specified host functions, transfer of the target data set to the storage node may accompany the host function request. For example, the target data set may be transferred in messages accompanying the function request and/or transferred concurrently to a remotely addressable buffer memory, such as controller memory buffer 570 and/or one or more host transfer buffers or storage buffers. In some embodiments, data set selector 522.2 may define a total data set comprised of a plurality of data units, such as files, objects, or messages within the total data set. The plurality of data units may each be comprised of a plurality of subunits that may be the target of defined functions, such as map-functions. In some embodiments, data set selector 522.2 may include an API or user interface for receiving selections of data set parameters or identifiers that may be sent from a client system.

In some embodiments, result formatter 522.3 may include an interface, function, or logic to receive and/or determine the format of the results to be returned to a requesting system, such as a client or host system. For example, result formatter 522.3 may receive the result output from applying the set of functions to the target data set and format in accordance with the preferences of the requesting system, such as simplifying results to a fixed value, delta value, array of values, file, object, metadata table, etc. In some embodiments, a map-reduce function set may return a final reduce-result in a defined format. For example, the map-reduce function set may return a total number of words, sentences, and paragraphs in a large text file or text object for novel by formatting three numeric values preceded by appropriate tags in accordance with a defined syntax, such as comma separated values. A result may be returned for each of the plurality of data units and/or for the total data set. In some embodiments, result formatter 522.3 may include an API or user interface for returning result values to a client system.

Metadata manager 524 may include interfaces, functions, and/or parameters for creating, modifying, deleting, accessing, and/or otherwise managing object or file metadata, such as metadata stored in metadata store 580. For example, when a new object is written to data store 590, at least one new metadata entry may be created in metadata store 580 to represent parameters describing or related to the newly created object. Metadata manager 524 may generate and maintain metadata that enables metadata manager 524 to locate object or file metadata within metadata store 580. For example, metadata store 580 may be organized as a key-value store and object metadata may include key values for data objects and/or operations related to those objects that are indexed with a key value that include the object identifier or GUID for each object. In some embodiments, metadata manager 524 may also manage metadata stored in data store 590 with the data objects or files, such as metadata tags or headers. Metadata manager 524 may work in conjunction with storage manager 526 to create, modify, delete, access or otherwise manage metadata stored as tags or headers within data store 590.

Storage manager 526 may include interfaces, functions, and/or parameters for reading, writing, and deleting data elements in data store 590. For example, object PUT commands may be configured to write object identifiers, object data, and/or object tags to an object store. Object GET commands may be configured to read data from an object store. Object DELETE commands may be configured to delete data from object store, or at least mark a data object for deletion until a future garbage collection or similar operation actually deletes the data or reallocates the physical storage location to another purpose.

In some embodiments, storage manager 526 may oversee writing and reading data elements that are erasure encoded on the storage medium of the storage devices on which data store 590 is stored. When a message or data unit, such as a file or data object, is received for storage, storage manager 526 may pass the file or data object through an erasure encoding engine. The data unit may be divided into symbols and the symbols encoded into erasure encoded symbols for storage in data store 590. In some embodiments, the symbols may be distributed among a plurality of storage nodes and/or storage devices to assist with fault tolerance, efficiency, recovery, and other considerations.

When the data unit is to be accessed or read, storage manager 526 may identify the storage locations for each symbol, such as using a data unit/symbol map stored in metadata store 580. Erasure encoded symbols may be passed through an erasure decoding engine to return the original symbols that made up the data unit to storage manager 526. The data unit can then be reassembled and used by storage manager 526 and other subsystems of storage interface 520 to complete the data access operation. Storage manager 526 may work in conjunction with metadata manager 524 for managing metadata, such as storage locations, versioning information, operation logs, etc. In some embodiments, storage manager 526 may work in conjunction with function processor 536 and/or function coordinator 546 to manage symbols and/or data units for the function processing.

In some embodiments, storage interface 520 may support metadata store 580 being distributed across multiple systems, such as a plurality of access systems. Metadata store 580 and/or portions thereof may be sharded data stores, wherein the data stores are partitioned into segments stored in different computing systems. Storage interface 520 may include the functions for locating and accessing relevant portions of the sharded data base.

Peer device configuration 528 may include a set of functions and parameters for receiving, storing, and otherwise managing configuration parameters for peer storage devices. For example, peer device configuration 528 may include a configuration file, table, log, or other data structure for listing each peer storage device in a peer group, such as the peer storage devices participating in a common namespace or other logical grouping configured for peer-to-peer data exchange. In some embodiments, a group of NVMe configured SSDs in the same namespace may be configured statically or dynamically (e.g., using discovery protocols and controllers) with peer storage device identifiers (such as subsystem names, ports, and other NVMe addressing information) and related parameters for directly accessing one or more direct memory access memory buffers, such as controller memory buffer 570. A peer group may include any configuration of storage devices with direct memory access to at least one buffer memory within another storage device in the peer group.

Buffer manager 530 may include a set of functions and parameters for managing one or more buffer memories within each storage device and/or other fabric nodes defined in storage system 500. For example, each storage device may include controller memory buffer 570 configured for receiving command messages and related data independent of host or storage buffers used for transferring host data for data store 590. Buffer manager 530 may be configured to manage both controller memory buffer 570 and host or storage buffers (not shown), as well as any other buffer memories within the storage devices. In some embodiments, buffer manager 530 may be configured to enable direct memory access to the buffer memories, such as controller memory buffer 570, from other fabric nodes. For example, buffer manager 530 may include a hardware and/or software direct memory access (DMA) engine 532. In some embodiments, buffer manager 530 may be configured to use buffer memory for transferring host function configurations and data among peer storage devices for sharing compute tasks. For example, buffer manager 530 may include a hardware and/or software peer allocator 534 configured to allocate buffer memory space for use by function processor 536 and/or function coordinator 546.

DMA engine 532 may include logic, protocols, and/or interfaces for providing direct memory access to memory buffers using a defined DMA protocol, such as remote direct memory access (RDMA). RDMA protocols may enable data movement directly between fabric nodes, such as peer storage devices, without higher-level data routing, such as through storage interface 520. RDMA protocols may be employed over fabric networks using Ethernet, fibre channel, and similar network technologies to enable DMA engine 532 to expose, allocate, and manage selective access to the buffer memory within a given storage device from fabric nodes outside of the storage device, such as peer storage devices. In some embodiments, DMA engine 532 may incorporate iWARP, RDMA over converged Ethernet (RoCE), or other RDMA standards.

Peer allocator 534 may include a set of functions and parameters for allocating buffer memory space to specific uses, including remote access by peer storage devices. For example, peer allocator 534 may include a data structure for identifying units of buffer memory, such as by starting location and length, and assigning them to specific memory usage. In some embodiments, controller memory buffer 570 may include portions of buffer memory that are dynamically allocated to receiving and/or sending command messages. Peer allocator 534 may be configured to select memory locations not presently in use by command messages (and/or unlikely to be used by command messages during present operation conditions) and allocate them to selected peer storage devices by registering those portions of memory with access permissions identifying the selected peer storage device. For example, peer allocator 534 may associate or assign a peer identifier 534.1 to a designated block of the buffer memory in a memory allocation table for the duration of a compute task assignment or corresponding processing stage.

In some embodiments, peer allocator 534 may select the size of the peer allocated memory based on a specific compute task being assigned and with specific sub-portions of the peer allocated memory designated for particular data. For example, peer allocator 534 may assign a total memory block that is the sum of a compute configuration space 534.2, an input data space 534.3, and an output data space 534.4. Compute configuration space 534.2 may be sized to include the functions and/or parameters for the assigned compute task. Input data space 534.3 may be sized to include the input data for the assigned compute task and/or parameters specifying an alternate location of the input data, such as another memory buffer, a storage location or other data unit identifier in the peer storage device, or elsewhere in data store 590. Output data space 534.4 may be sized to include a location for the expected output, such as an intermediate result, from the assigned compute task. In some embodiments, output data space 534.4 may overlap compute configuration space 534.2 and/or input data space 534.3, since the return of output data will sequentially follow the reading (and transfer) of compute configuration and input parameters (and/or data) to the assigned peer storage device. For example, the allocated space may be the greater of the size of output data space 534.4 and the sum of compute configuration space 534.2 and input data space 534.3.

Function processor 536 may include a set of functions and parameters for executing an assigned compute task that contributes to processing a host function request within the storage nodes without moving the input data back to the requesting host. For example, function processor 536 may identify target input data units, such as input data in controller memory buffer 570 of another peer storage device, stored in a local storage medium or buffer memory of the assigned storage device, or elsewhere in data store 590 and then process the input data through one or more data functions, such as user or host data processing functions received through client request handler 522. In some embodiments, function processor 536 may be implemented in each storage device of storage system 500 to enable local processing of locally stored data units and/or data units that can be accessed through direct memory access to peer storage devices accessible to function processor 536. For example, function processor 536 may use local memory 516, local processor 514, local storage media for data store 590, and/or DMA memory available through peer device configuration 528 to select input data, process the compute task, store intermediates, and publish results in parallel with other peer storage devices to share compute tasks. In some embodiments, function processor 536 may operate responsive to compute tasks assigned by function coordinator 546 in a peer storage device in the peer group acting as the master storage device for the host function. This may include an instance of function processor 536 within the master storage device that selectively receives assigned tasks from function coordinator 546 in the same storage device that have not been shared to other peer storage devices.

User data processing functions may include data functions that operate on stored user data regardless of physical storage location, encoding, redundancy, encryption, and storage management functions used by the storage system to manage data storage. For example, user data processing functions may include data transformations, extractions, abstractions, feature identification, and other processes to support client application processing of data for applications like data analysis, artificial intelligence training, image processing, pattern recognition, etc.

In some embodiments, function processor 536 may include a plurality of hardware and/or software modules configured to use processor 514 and memory 516 to handle or manage defined operations of function processor 536. For example, function processor 536 may include an input data selector 538, a compute processor 540, an intermediate manager 542, and a result publisher 544.

Input data selector 538 may include functions, parameters, and/or logic for selecting a target input data unit, such as data blocks, data symbols, data objects, and/or a data frame within another data unit that is the target of the assigned compute task, for executing one or more functions against. For example, input data selector 538 may identify a target data unit for retrieval and processing in input data space 534.3 in controller memory buffer 570 of the master storage device for the host function. In some embodiments, function processor 536 may receive a notification message from function coordinator 546 that indicates a compute configuration, input data source, and output data location. For example, function coordinator 546 may send a compute task request to a target peer storage device that function coordinator 546 is assigning the task. The compute task request may indicate the compute task data location in controller memory buffer 570 and input data selector 538 may parse the input data location for the compute task from the compute task request and/or input data space 534.3 in controller memory buffer 570. Input data selector 538 may return a target input data unit or indicate a buffer memory location to compute processor 540 for processing in accordance with the compute configuration for the compute task.

Compute processor 540 may include functions, parameters, and/or logic for processing the input data selected by input data selector 538 in accordance with the functions and processing parameters in the compute configuration for the compute task. For example, compute processor 540 may receive a host function or a portion of a host function, such as a map function or another sub-function, targeting the selected input data. In some embodiments, compute processor 540 may be preconfigured with one or more standard host functions for processing specific data types, such as a portion of video or other media encoding or decoding algorithms, and the received compute configuration may indicate the selected host function and related parameters to be used for the compute task (without having to transfer the function itself). In some embodiments, compute processor 540 may execute compute task processing functions that include subunit processing functions configured to process or transform the data contents of a target subunit into an intermediate result to be stored and further processed and/or published back to the master storage device (or directly to the host). Compute processor 540 may return one or more result values for storage by intermediate manager 542 and/or publishing by result publisher 544.

Processing functions received and/or invoked by compute processor 540 may include one or more serial-functions that operate on prior intermediate data, apply a serial-function to the target input data (which may include previously stored intermediate data results), and generate new intermediate data for forwarding to the next stage of compute tasks. Processing functions may include one or more map-functions that process the target input data unit and return an intermediate result for aggregation or further processing. Map-functions may be processed in parallel across embodiments of function processor 536 in multiple peer storage devices.

Intermediate manager 542 may include functions, parameters, and/or logic for storing intermediate results from the results of compute processor 540. For example, results of compute processor 540 may be stored to local buffer memory and/or the storage medium in the storage device for further processing. In some embodiments, the compute configuration for the compute task may include a multi-step or iterative process for processing the input data that generates intermediate data that is aggregated or further processed over the compute task. In some embodiments, the compute configuration for the compute task may generate an intermediate result to form the input data for a next stage of the host function processing. For example, the present compute task may generate an intermediate result that is stored locally and the same storage device may be tasked with the next compute task that targets that prior intermediate result as the input data for the next compute task. In some embodiments, the compute configuration for both the prior compute task and dependent compute task may identify the relationship between tasks. The output location for the prior compute task may designate local storage of the intermediate result and the dependent compute task may designate local storage as the source location for the input data.

Result publisher 544 may include logic for identifying the destination for the results of the compute task. In some instances, the assigned compute task may be a final shared compute task and may identify the master storage device or a host accessible storage location for receiving the result data from the compute task. In some instances, the assigned compute task may be an intermediate compute task where the master storage device will complete any additional compute tasks and/or reallocate intermediate results to peer storage devices as input for the next stage of compute tasks and intermediate results are returned to the master storage device in the output data space 534.4 designated for each peer storage device assigned a compute task. In some instances, the assigned compute task may be an intermediate compute task that identifies the peer storage device assigned the next compute task involving the intermediate result and intermediate results are stored locally in remotely addressable memory buffers (if the destination is a peer storage device) or a local buffer memory or storage medium if the assigned storage device is the same for both compute tasks. Result publisher 544 may be configured to return a process complete notification to function coordinator 546. For example, the process complete notification may indicate that the process successfully completed (or return an appropriate error message), include the output data result, and/or indicate the location of the output data result, such as a symbol processing request may specify the destination for the intermediate context, such as output data space 534.4 or a local buffer memory space.

Function coordinator 546 may include a set of functions and parameters for coordinating compute task processing among a plurality of peer storage devices, where each storage device may be assigned a compute task for their function processor 536 and return a result, such as an intermediate result. For example, function coordinator 546 may enable a storage device configured for the function coordinator role to receive a data function request through client request handler 522, determine a plurality of compute tasks for sharing the processing of the data function request, assign a plurality of peer storage devices to execute the compute tasks, and coordinate result aggregation, task dependencies, stages, and any post processing before returning a function result through client request handler 522.

In some embodiments, any peer storage device in a peer group may access function coordinator 546 to act as a central controller for distributed function processing among the peer group. That is, each peer storage device may include function coordinator 546 and a host, client, storage controller, or other requesting application or storage management intermediary may select which peer storage device will have the master storage device role for the purposes of that function request. For example, a storage device among the peer storage devices may be selected randomly, based on a round robin or similar algorithm, or using available storage, available processing, load balancing, or similar criteria for selecting the storage device to act as master for any given data function. In some embodiments, the location of input data for the data function may be a factor in considering which peer storage device to nominate as the master storage device for that data function request.

In some embodiments, function coordinator 546 may include a plurality of hardware and/or software modules configured to use processor 514 and memory 516 to handle or manage defined operations of function coordinator 546. For example, function coordinator 546 may include a task analyzer 548, a task assigner 550, a peer notification handler 552, an intermediate result collector 554, and a compute stage manager 556. In some embodiments, function coordinator 546 may include or have access to peer device configuration 528, buffer manager 530, and/or function processor 536 for executing the master storage device role for sharing compute tasks.

Task analyzer 548 may include functions, parameters, and/or logic for determining the set of compute tasks that a function request can be divided into. For example, task analyzer 548 may generate a list of compute tasks corresponding to the function request. In some embodiments, compute tasks may be determined based on the divisibility of the input data into subunits for data processing. For example, certain data types and functions may enable flexible division of data units, such as unstructured or text data, and/or logical division of data, such as video into frames or hierarchically structured data by level or branch. In some embodiments, compute tasks may be determined based on the location of data and input data stored in different locations may be grouped for each location (and, ideally, assigned to a co-located or near function processor 536 for processing). In some embodiments, compute tasks may be determined by different sub-functions, such as map functions and reduce functions in map-reduce functions, and/or stages of processing sub-functions with dependencies on prior sub-functions. For example, in media decoding, such as media encoded with an MP3 (Moving Pictures Expert Group (MPEG)-1 Audio Layer III) codec, fast Fourier transform (FFT) functions could be allocated to compute tasks separately from the modified discrete cosine transform (MDCT) evaluation of the output of those FFT functions. In some embodiments, task analyzer 548 may return a list of compute tasks that can be distributed among peer storage devices.

Task assigner 550 may include functions, parameters, and/or logic for assigning compute tasks among peer storage devices, including the master storage device executing function coordinator 546. For example, task assigner 550 may receive the breakdown list of compute tasks from task analyzer 548 and include logic for dividing those compute tasks among a master task list 550.1 that is assigned to the master storage device and peer task lists 550.2 for each peer storage device that will receive one or more peer compute tasks. In some embodiments, the compute tasks determined by task analyzer 548 may each be described by a compute definition 550.3, which includes the functions and parameters for processing the input data, and an input definition 550.4, which includes the location and parameters describing the input data for the compute task. In some embodiments, task assigner 550 may return master task list 550.1 and peer task lists 550.2 after all compute tasks have been assigned and function coordinator 546 may use a combined compute task list with storage device identifiers for the assigned tasks (both master and peer) to manage completion, stages, additional processing, and/or the return of host function results.

In some embodiments, task assigner 550 may use compute definition 550.3 and input definition 550.4 to both determine the assignments for each compute task and to communicate those compute tasks to the peer storage devices. For example, task assigner 550 may evaluate compute definition 550.3 and input definition 550.4 to estimate processing requirements, processing time, input data location, and other factors for determining peer storage device assignments. Then, task assigner 550 may access peer allocator 534 to assign memory buffer space for each peer storage device and their respective compute tasks, then store compute definition 550.3 in compute configuration space 534.2 and store input definition 550.4 in input data space 534.3. In some embodiments, compute definition 550.3 may include a function definition and associated parameters for executing the function on the target input data. In some embodiments, the function definition may be provided by reference to a function that is already stored in or available to function processor 536 in the target peer storage device. In some embodiments, input definition 550.4 may include the input data units to be processed or storage location information for accessing the input data units.

Peer notification handler 552 may include functions, parameters, and/or logic for sending compute task request notifications to function processor 536 in peer storage devices and receiving compute task complete notifications (or related error messages) from the peer storage devices. For example, responsive to task assigner 550 assigning a compute task to a target peer storage device and storing the compute task information in controller memory buffer 570, peer notification handler 552 may send a compute task request to the peer storage device using a peer communication channel and the compute task request may identify compute configuration space 534.2, input data space 534.3, and output data space 534.4 for the compute task information and results. Responsive to function processor 536 in the peer storage device completing the compute task, function processor 536 may return a compute task complete message to peer notification handler 552. Peer notification handler 552 may return a status indicator for each peer compute task.

Intermediate result collector 554 may include functions, parameters, and/or logic for receiving and organizing intermediate results from peer storage devices. For example, as peer storage devices complete their compute tasks and peer notification handler 552 receives notification, intermediate result collector 554 may receive intermediate results from the peer storage devices. In some embodiments, intermediate results may be received in output data space 534.4 in controller memory buffer 570 for the target peer storage device and compute task. Intermediate result collector 554 may read the output data from output data space 534.4 and store the intermediate results in another storage location, such as another memory buffer location or the storage media in the master storage device. In some embodiments, intermediate results may be received in the notification message or the notification message may indicate an alternate output data space, such as controller memory buffer 570 of the peer storage device or another buffer memory space accessible to both storage devices.

Compute stage manager 556 may include functions, parameters, and/or logic for managing a series of compute stages for a multi-stage host function or multi-stage approach to allocating compute tasks. For example, a host function may define two or more stages of compute task processing where a second stage is dependent on the output of a first stage, either for processing input data to the second stage or determining one or more parameters for the second stage. In some embodiments, task assigner 550 may determine that a number of compute tasks that could be processed in parallel (i.e. they lack dependencies) should be processed in stages to better coordinate load balancing, input data access/proximity, or other factors. Compute stage manager 556 may initiate a series of two or more stages, where each stage is conducted similarly a function shared among peers in a single phase. In some embodiments, compute stage manager 556 may invoke task analyzer 548 and/or task assigner 550 to dynamically configure compute tasks and storage device assignments for each stage of the multi-stage function processing. In some embodiments, compute stage manager may return status indicators for each stage of the compute process and may coordinate with peer notification handler 552 and intermediate result collector 554 to determine completion of each stage before initiating a subsequent stage.

Memory 516 may include additional logic and other resources (not shown) for processing data requests, such as modules for generating, queueing, and otherwise managing object or file data requests. Processing of a data request by storage interface 520 may include any number of intermediate steps that yield at least one data request to the distributed storage system.

Figure 6:
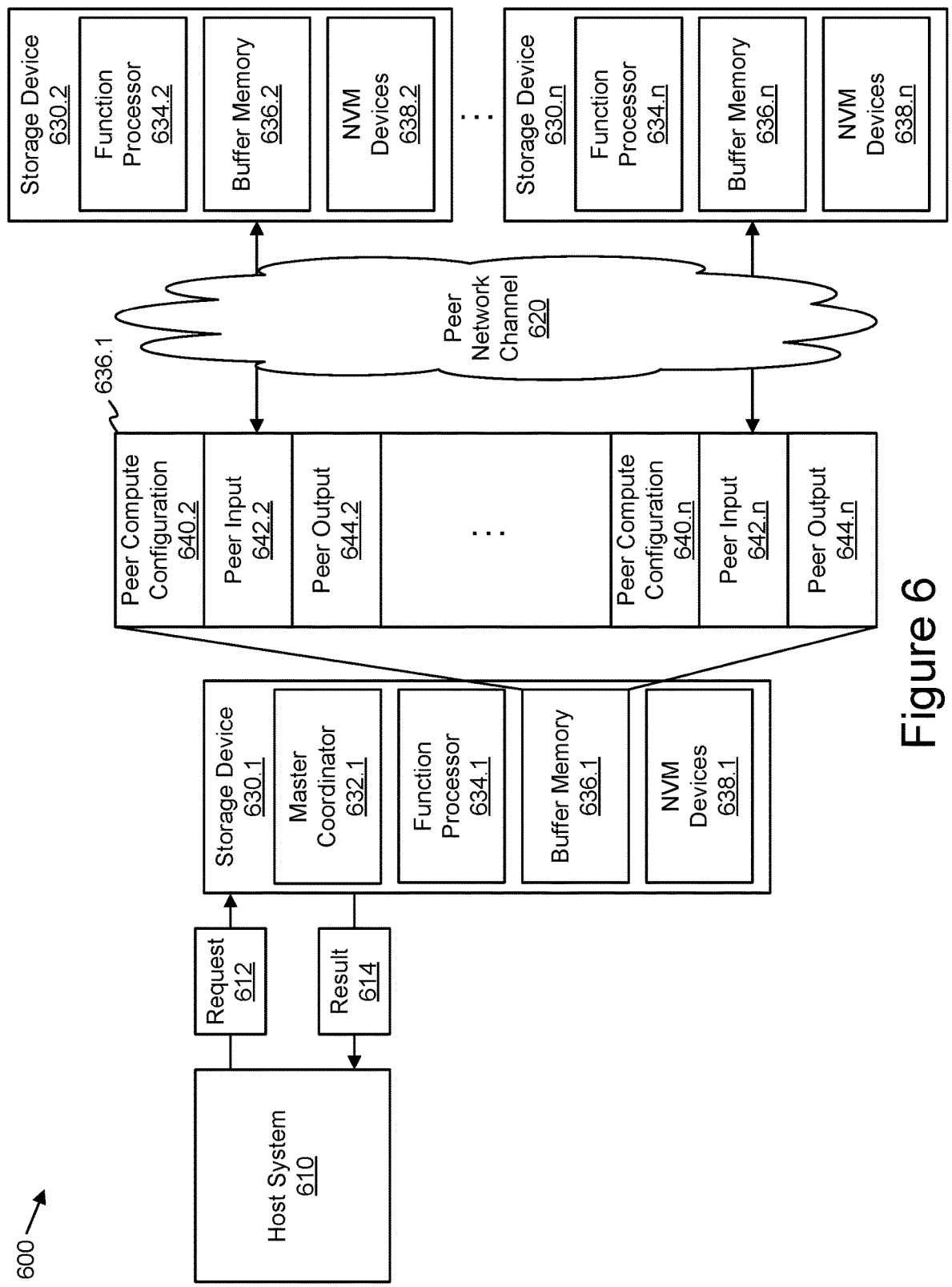
FIG. 6 schematically illustrates an example compute process being processed by a plurality of peer storage devices.

FIG. 6 shows an example storage system 600 that includes storage devices 630.1-630.n configured for shared function processing using peer-to-peer communications over peer network channel 620. For example, storage devices 630 may be NVMe SSDs in an SSD storage array or high-performance server with fabric interconnects that enable direct memory access to peer buffer memories 636 as peer network channel 620. In some embodiments, storage devices 630 may be configured similarly to storage system 500 in FIG. 5 for distributed processing using a master storage device (e.g., storage device 630.1) for handling the host function request from host system 610.

Host system 610 may include one or more applications configured to store and retrieve data elements from storage devices 630 and offload selected host functions to the processors in storage devices 630. In some embodiments, host system 610 may be configured to read, write, and otherwise manage data elements, such as data units stored in non-volatile memory (NVM) devices 638 of storage devices 630, using a storage system interface API. Host system 610 may also be configured to initiate function processing on target data units stored in storage devices 630 and/or sent to storage devices 630 with function request 612. Host system 610 may be a remote host system that is not collocated with storage device 630.1 and may be configured to remotely issue function request 612. Function request 612 may include function definitions, parameters, and input data identifiers (and/or the input data itself). Function result 614 may include the result or output data from processing the input data in accordance with the requested function or set of functions. In some embodiments, function request 612 may access predefined functions enabled in function processors 634 by providing appropriate function identifiers and parameters in the function definition. Similarly, function results 614 may be provided according to a predefined output format.

Host system 610 may send function request 612 to storage device 630.1, which is designated as the master storage device for the purpose of processing function request 612. In some embodiments, host system 610 selects the master storage device from the group of storage devices 630. In some embodiments, host system 610 sends function request 612 to a storage node or another storage device and the storage node or group of storage devices 630 determine which storage device will act as master storage device for function request 612. Master storage device 630.1 may include master coordinator 632.1 for executing the coordinator role for function request 612. For example, master coordinator 632.1 may operate similar to function coordinator 564 in FIG. 1 in response to receiving function request 612. In some embodiments, each storage device 630 includes a function coordinator, but only one acts as master coordinator 632.1 for any given function request 612.

Each storage device 630.1-630.n may include a function processor 634.1-634.n for processing compute tasks in support of function request 612. For example, each function processor 634 may process an assigned compute task from master coordinator 632.1. Each storage device 630.1-630.n may include a buffer memory 636.2 configured for direct memory access. For example, each storage device 630 may include a controller memory buffer that is remotely accessible over the NVMe fabric and interfaces that make up peer network channel 620. In some embodiments, buffer memory 636.1 may be configured to coordinate the transfer of compute tasks to peer storage devices 630.2-630.*n* over peer network channel 620. For example, master coordinator 632.1 may store compute task information for each peer storage device 630.2-630.*n* in buffer memory 636.1. In some embodiments, buffer memory 636 may include a command memory buffer that is allocated for command messages and not allocated for host storage data transfer. Each storage device 630.1-630.*n* may use their respective buffer memory 636.1-636.*n* and/or NVM devices 638.1-638.*n* for storing input data and/or intermediate results in support of function request 612.

Master coordinator 632.1 may be configured to allocate buffer memory 636.1 for specific peer storage devices and their assigned compute tasks. For example, for each peer storage device 630.2-630.*n*, master coordinator 632.1 may store a peer compute configuration 640.2-640.*n* defining the function configuration information needed for each assigned compute task in a task configuration space. Master coordinator 632.1 may store a peer input 642.2-642.*n* defining the input data for each assigned compute task in a task input space. Master coordinator 632.1 may allocate a peer output 644.2-644.*n* defining an authorized buffer space to receive the output data for each assigned compute task directly from the peer storage device assigned. Thus, each peer storage device 630.2-630.*n* may access buffer memory 636.1 to receive their compute task information, such as peer compute configuration 640 and peer input 642, and publish their compute task output, such as peer output 644.

Figure 7:
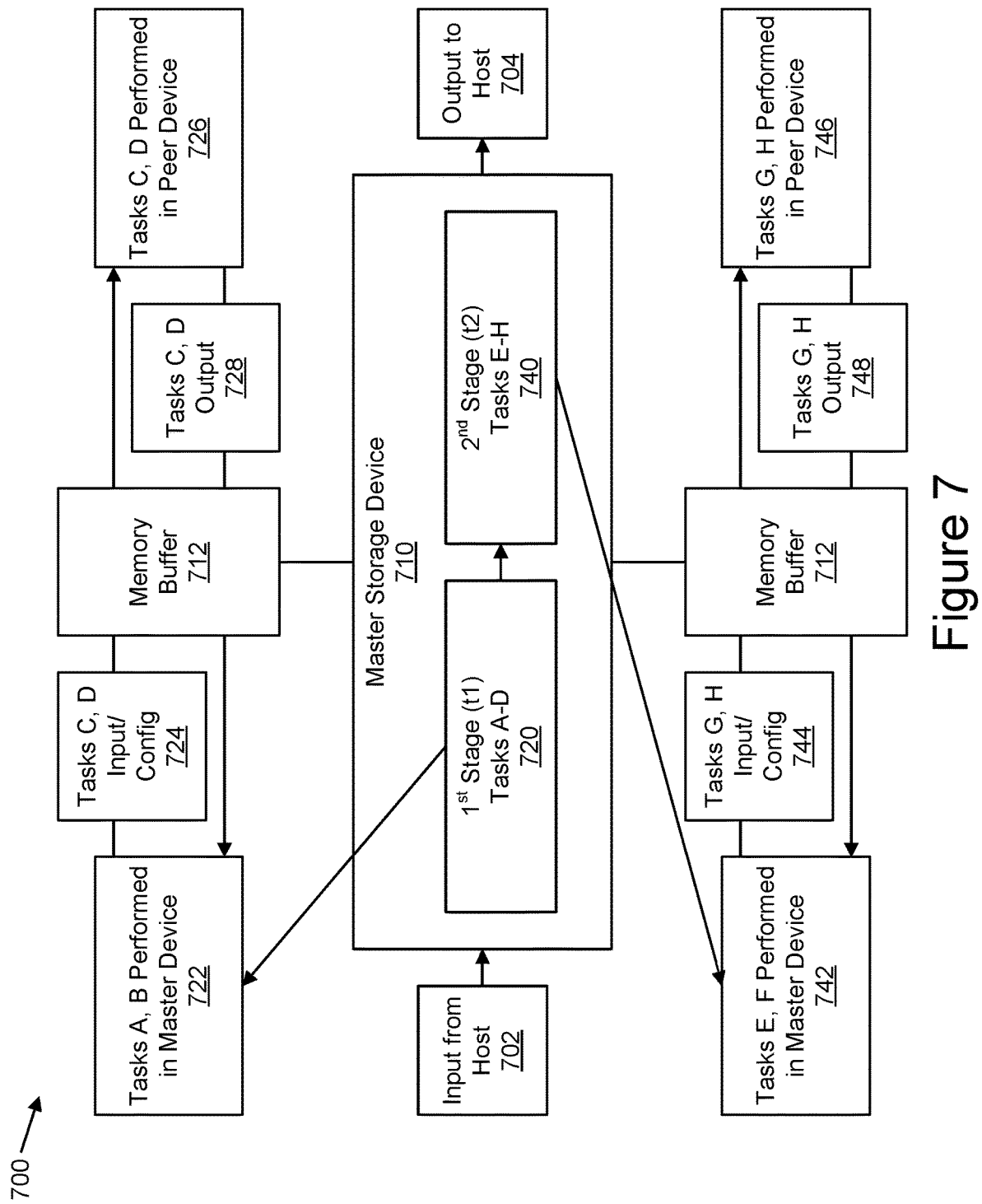
FIG. 7 schematically illustrates an example multi-stage compute process being processed by a plurality of peer storage devices.

FIG. 7 shows an example process 700 that includes a master storage device 710 configured to receive input from a host system at block 702, coordinate processing a function request in two stages 720 and 740 through memory buffer 712, and provide output to the host system at block 704. In some embodiments, master storage device 710 may be configured similarly to storage devices in storage system 500 in FIG. 5 with peer device configuration 528, buffer manager 530, function processor 536, and function coordinator 546.

At block 702, input from the host is received by master storage device 710. For example, a host system may send a function request to master storage device 710 that includes input data and a function configuration for a host function. Master storage device 710 may be configured to breakdown the function configuration and input data into a set of compute tasks and determine the storage devices and processing stages that will be used to complete the host function processing. In the example shown, master storage device 710 determines that the host function processing will involve a first stage 720 at time t1 for compute tasks A-D and a second stage 740 at time t2 for compute tasks E-H. Intermediate results from tasks A-D may be stored and/or passed to tasks E-H and the aggregate output of tasks A-H may be used to determine final results. The final function results may be output back to the host system at block 704.

In first stage 720, compute tasks A and B may be performed by master storage device 710 at block 722. For example, compute tasks A and B may be executed by a function processor in master storage device 710 without transferring compute task information to another storage device. At block 724, compute task information for tasks C and D, such as input data and function configuration definitions, may be stored in memory buffer 712 for retrieval and use by the assigned peer storage device. At block 726, tasks C and D may be performed by the assigned peer storage device. For example, the peer storage device may read the input data and function configuration definition from memory buffer 712 and process the compute tasks using its function processor. At block 728, the output data from tasks C and D may be returned to master storage device 710 through memory buffer 712. For example, the peer storage device may store the intermediate results data in an output data space allocated for tasks C and D in memory buffer 712 and master storage device 710 may access them there.

In second stage 740, compute tasks E and F may be performed by master storage device 710 at block 742. For example, compute tasks E and F may be executed by the function processor in master storage device 710 without transferring compute task information to another storage device. At block 744, compute task information for tasks G and H, such as input data and function configuration definitions, may be stored in memory buffer 712 for retrieval and use by the assigned peer storage device, which may be different than the peer storage device assigned in first stage 720. At block 746, tasks G and H may be performed by the assigned peer storage device. For example, the peer storage device may read the input data and function configuration definition from memory buffer 712 and process the compute tasks using its function processor. At block 748, the output data from tasks G and H may be returned to master storage device 710 through memory buffer 712. For example, the peer storage device may store the intermediate results data in an output data space allocated for tasks G and H in memory buffer 712 and master storage device 710 may access them there.

Figure 8:
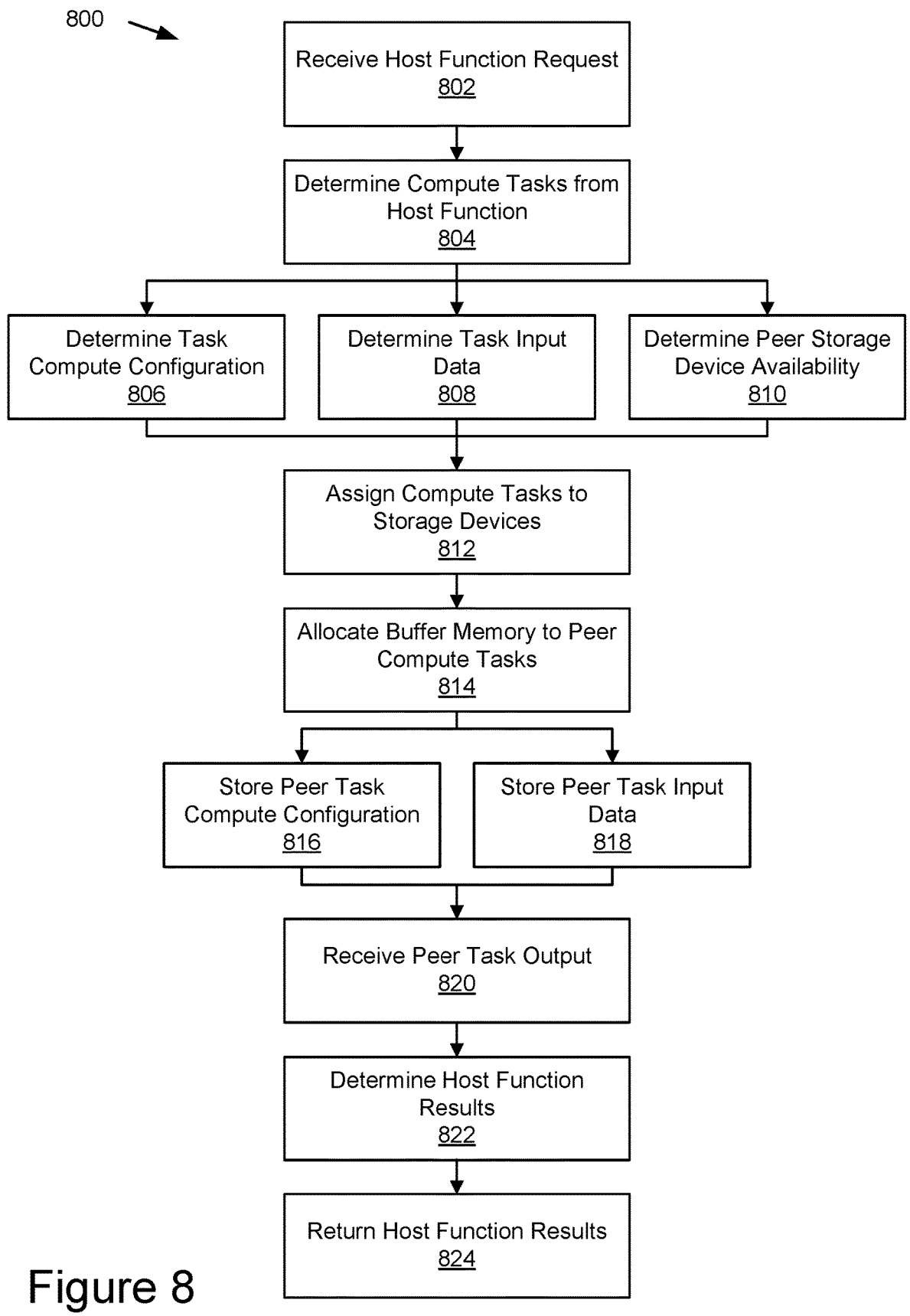
FIG. 8 illustrates an example method of function processing through a master peer storage device.

As shown in FIG. 8, the storage system 500 may be operated according to an example method of shared processing of data functions across peer storage devices, i.e. according to the method 800 illustrated by the blocks 802-824 of FIG. 8.

At block 802, a host function request may be received. For example, a storage interface of a storage node may receive a request message including a host function type, function parameters, and target input data identifiers in a host function definition.

At block 804, compute tasks may be determined from the host function. For example, a function coordinator in one of the storage devices in the storage node may parse the host function definition to determine compute operations and/or input data units that may be separated and independently processed. Each independent function and input data subunit may define a compute task in a set of compute tasks corresponding to the host function. For each compute task identified, blocks 806-810 may be executed prior to proceeding to block 812.

At block 806, a task compute configuration may be determined for each compute task. For example, the function coordinator may identify compute task function and/or function parameters for the compute task and organize them in a task compute configuration that can be shared with the storage device assigned the compute task.

At block 808, the task input data may be determined. For example, the function coordinator may identify the data subunits of the input data that are targeted for the compute task and organize them in a task input data identifier that can be shared with the storage device assigned the compute task.

At block 810, peer storage device availability may be evaluated. For example, the function coordinator may determine which storage devices with which it has peer communication capabilities are presently available and/or accepting compute tasks. This evaluation may be based on static configuration information and/or dynamic status information regarding the peer storage devices.

At block 812, each compute task may be assigned to a storage device for processing. For example, the function coordinator may assign compute tasks to function processors in two or more available peer storage devices, including the function processor in the master storage device.

At block 814, buffer memory may be allocated to each compute task that is being shared with a peer storage device. For example, for each peer compute task, a buffer manager may allocate memory buffer space for communicating compute task information to each target peer storage device and enable access to the space based on a peer storage device identifier.

At block 816, the peer task compute configuration may be stored in the allocated buffer memory for each peer compute task. For example, the function coordinator may store the task compute configuration determined at block 806 in the allocated memory buffer space for that peer storage device and assigned peer compute task.

At block 818, the peer task input data may be stored in the allocated buffer memory for each peer compute task. For example, the function coordinator may store the task input data identifiers determined at block 808 in the allocated memory buffer space for that peer storage device and assigned peer compute task.

At block 820, peer task output may be received from each of the peer storage devices assigned compute tasks. For example, the function coordinator may receive intermediate results from each peer compute task from the peer storage devices.

At block 822, the host function results may be determined based on the peer task output. For example, the intermediate results from the peer compute tasks may be combined with intermediate results from compute tasks retained by the master storage device and those combined results may be further processed (possibly through another compute task executed by the master storage device) to generate the host function result.

At block 824, the host function results may be returned to the requesting host system. For example, the storage interface may format and send a response message to the host function request indicating completion of the host function and including the result data or indicating a storage location where the host function results data may be accessed and retrieved.

Figure 9:
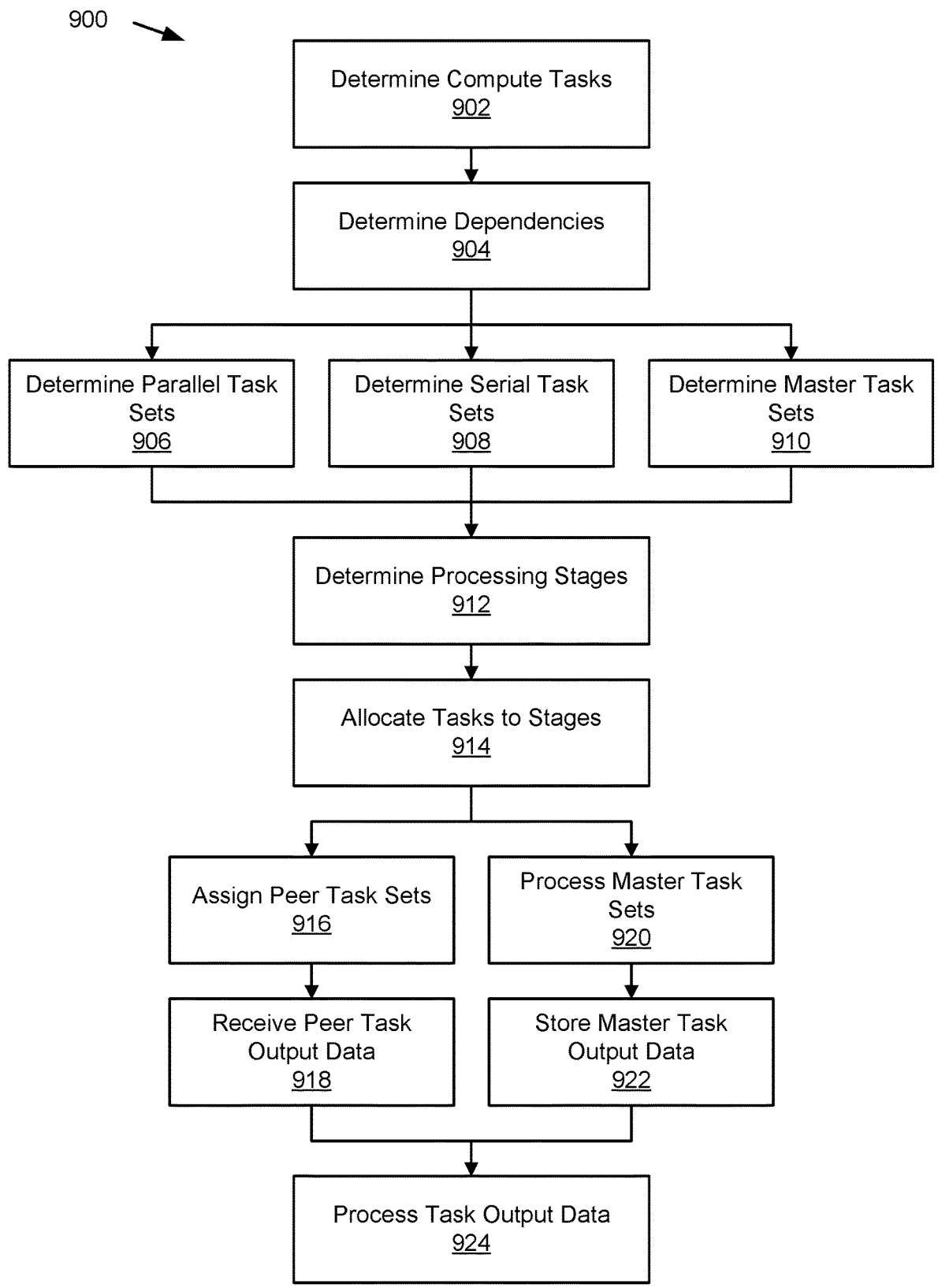
FIG. 9 illustrates an example method of allocating compute tasks by a master peer storage device.

As shown in FIG. 9, the storage system 500 may be operated according to an example method of allocating compute tasks for processing a host function across peer storage devices, i.e. according to the method 900 illustrated by the blocks 902-924 of FIG. 9. In some embodiments, method 900 may operate in conjunction with method 800 in FIG. 8.

At block 902, compute tasks may be determined from the host function. For example, a function coordinator in one of the storage devices in the storage node may parse the host function definition to determine compute operations and/or input data units that may be separated and independently processed. Each independent function and input data subunit may define a compute task in a set of compute tasks corresponding to the host function.

At block 904, dependencies between compute tasks may be determined. For example, the function coordinator may analyze which compute tasks require intermediate results from another compute task before being processed. Based on the dependencies, the set of compute tasks for the host function may be organized into subsets in blocks 906-910 to assist in organizing and assigning processing.

At block 906, parallel task sets may be determined. For example, the function coordinator may determine one or more groups of compute tasks that do not include any dependencies and/or all include the same dependency and may be executed in parallel across two or more function processors.

At block 908, serial task sets may be determined. For example, the function coordinator may determine one or more groups of compute tasks that include dependencies and may be used to structure a series of processing stages to make sure that each dependency is completed before executing the dependent compute task (without necessarily managing individual dependencies during compute task processing).

At block 910, master task sets may be determined. For example, the function coordinator may determine one or more compute tasks that should be centralized within the master storage device, such as pre-processing, aggregation of intermediate results, and post-processing peer output data. Note that master task sets may not include all compute tasks that are ultimately assigned to the master storage device, but only the required or recommended master tasks. The master storage device may still share in the load of other compute tasks that can be shared by any peer storage device.

At block 912, processing stages may be determined. For example, the function coordinator may determine one or more processing stages based on serial processing relationships and/or processing load relative to the number of available peer storage devices.

At block 914, compute tasks may be allocated across stages. For example, the function coordinator may allocate each compute task to a processing stage determined at block 912 and organize them by peer compute tasks and master compute tasks.

At block 916, peer task sets are assigned to peer storage devices. For example, the function coordinator may assign each peer compute task in the current processing stage to a peer storage device. At block 918, peer task output data may be received from the assigned peer storage devices. For example, peer compute tasks may be assigned and managed as described above for method 800 in FIG. 8 and intermediate results may be received by the master storage device.

At block 920, master task sets may be processed by the master storage device. For example, a function processor in the master storage device may process the master compute tasks in the current processing stage. At block 922, the master task output data may be stored by the master storage device. For example, intermediate results from the master compute tasks may be stored similar to the intermediate results received from peer compute tasks for subsequent processing.

At block 924, compute task output data may be processed. For example, intermediate results from all compute tasks in a stage may be processed together before initiating a next stage or determining the host function result data if no stages remain to be processed.

Figure 10:
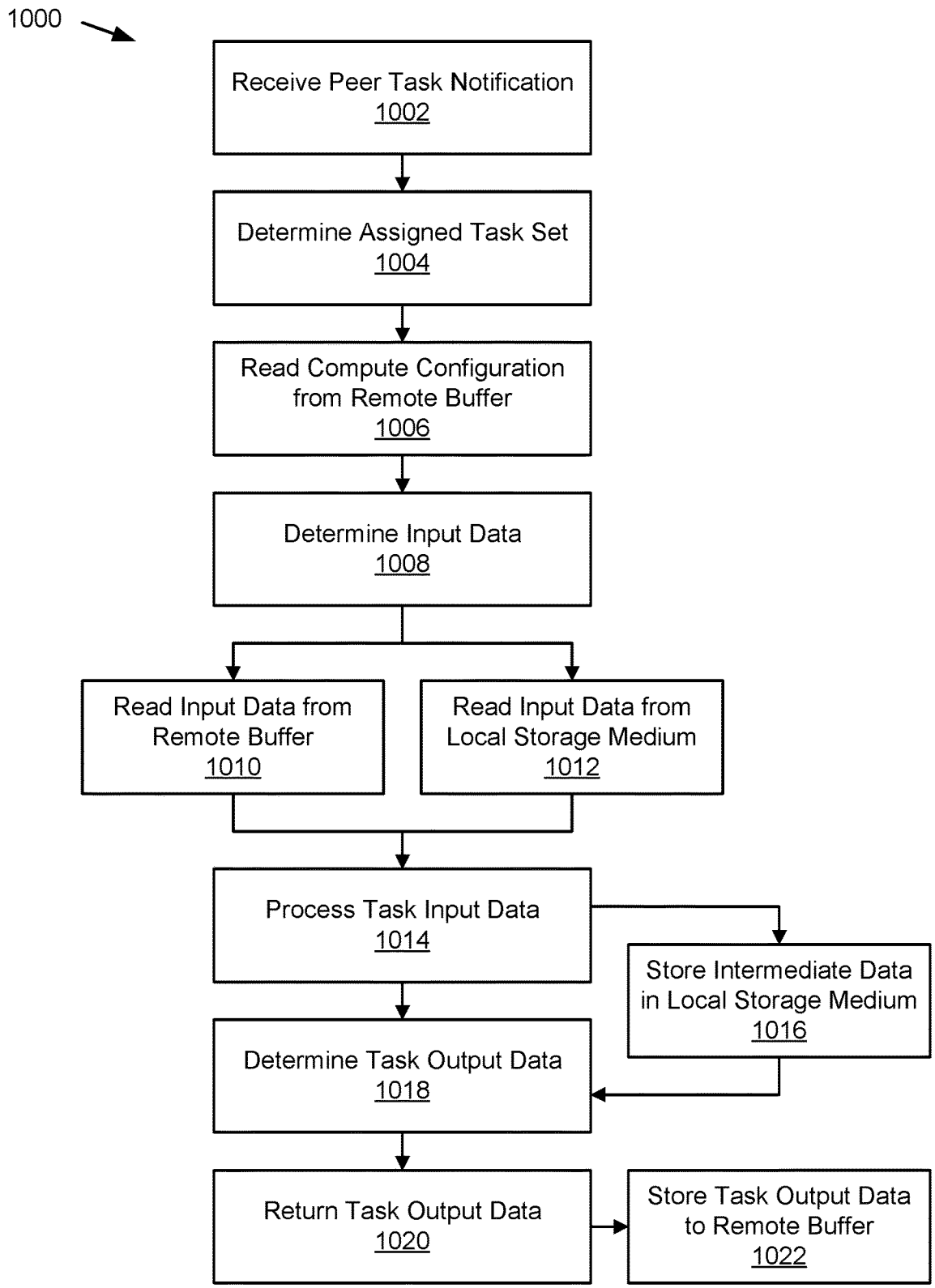
FIG. 10 illustrates an example method of executing compute tasks by a peer storage device.

As shown in FIG. 10, the storage system 500 may be operated according to an example method of processing shared compute tasks in peer storage devices, i.e. according to the method 1000 illustrated by the blocks 1002-1024 of FIG. 10. In some embodiments, method 1000 may operate responsive to method 800 in FIG. 8 and/or method 900 in FIG. 9.

At block 1002, a peer task notification may be received. For example, a function processor in a peer storage device may receive a notification from the master storage device that a peer compute task has been assigned and the compute configuration information is available in a specified memory buffer location.

At block 1004, the assigned task set may be determined. For example, the function processor in the peer storage device may determine that one or more compute tasks have been assigned and the memory buffer locations for those compute tasks from the notification received at block 1002.

At block 1006, compute configuration information may be read from the remote buffer. For example, the function processor in the peer storage device may read the compute configuration information from the buffer memory location in the master storage device.

At block 1008, input data may be determined. For example, the compute configuration information may include both function definition and input data definition. In some embodiments, the input data definition may provide a buffer location for reading the input data. At block 1010, the input data may be read from the remote buffer, such as a buffer memory or storage buffer in the master storage device or another peer storage device. In some embodiments, the input data definition may provide another storage location, such as a storage location or data unit identifier in the local storage medium of the peer storage device. At block 1012, the input data may be read from a local storage medium, such as the NVM devices in the peer storage device.

At block 1014, the compute task data input may be processed using the function defined in the compute configuration. For example, the function processor may process the target input data for the compute task using the function and parameters provided in the compute configuration. In some embodiments, intermediate data from the compute task processing may be stored in a local storage medium at block 1016. For example, a compute task may extract, transform, abstract, or otherwise generate new data from the input data and may store that data in a local buffer memory or to the local storage medium in the peer storage device.

At block 1018, compute task output data may be determined. For example, the function processor may generate compute task result data from the processing at block 1014 and/or the intermediate data results the process generated.

At block 1020, compute task output data may be returned. For example, the function processor may return the compute task results as output data to the master storage device and/or send a compute task complete message. In some embodiments, task output data may be stored back to the remote memory buffer in the master storage device for access and further processing by the master storage device to generate the host function results.

A host function may include any data processing task or process to be executed against the subunits of an input data unit that return function results based on the contents of the input data, which may include metadata tags. Input data units may be defined through the presence of the data itself (e.g., in a message or known buffer location) or a reference to a storage location or other unique identifier for accessing the target data in the storage media of the storage devices (directly or through a storage interface). A host function may be divided into a set of compute tasks, where each compute task is represented by a compute task function and/or function parameters and an input data set, where the input data set is a compute task subset of the input data for the host function and/or intermediate result data generated therefrom. A predefined function may include a host function and/or compute task function defined by the storage system to support distributed processing at the storage nodes, which may be embodied in function definitions in the storage system (and may therefore be called by the function processors rather than being received in the function configuration from the host or master storage device). In some embodiments, predefined data functions may accept one or more function parameters for customizing their use to a specific data processing task. Function parameters may include argument parameters, such as ranges, thresholds, seed values, or other variables for a predefined data function that modify how data parameters or contents of the subunits are selected, counted, aggregated, or otherwise transformed into a function result. In some embodiments, function parameters may support complex logical parameters defined through a language syntax, such as structured query language (SQL). For example, a predefined data function may include SQL processing support for a defined command set supported by the contents and syntax of a data unit type.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage device, comprising:
   a storage medium;
   a remotely accessible buffer memory configured for direct memory access by a plurality of peer storage devices over a network fabric; and
   a processor coupled to the storage medium and the remotely accessible buffer memory, the processor configured to:
   determine a plurality of compute tasks associated with a remotely issued host function;
   determine a target peer storage device from the plurality of peer storage devices;
   assign a peer compute task from the plurality of compute tasks to the target peer storage device;
   store a first task compute configuration in the remotely accessible buffer memory for access by the target peer storage device, wherein the target peer storage device is configured to:
   process first task input data using the first task compute configuration; and
   return first task output data;
   execute a master compute task from the plurality of compute tasks using a second task compute configuration to process second task input data and return second task output data;
   store the second task output data;
   receive, from the target peer storage device, the first task output data; and
   determine, based on the first task output data and the second task output data, a host function result.

2. The storage device of claim 1, wherein the processor is further configured to store the first task input data in the remotely accessible buffer memory for access by the target peer storage device.

3. The storage device of claim 1, wherein the processor is further configured to receive, from the target peer storage device, the first task output data in the remotely accessible buffer memory.

4. The storage device of claim 1, wherein:
   the target peer storage device is a first target peer storage device from the plurality of peer storage devices;
   the peer compute task is a first peer compute task in a first set of parallel tasks from the plurality of compute tasks associated with the remotely issued host function;
   the processor is further configured to:
   determine the first set of parallel tasks;
   determine a second set of parallel tasks from the plurality of compute tasks associated with the remotely issued host function;
   determine a second target peer storage device from the plurality of peer storage devices;
   assign a second peer compute task in the second set of parallel tasks to the second target peer storage device; and store a third task compute configuration associated with the second peer compute task in the remotely accessible buffer memory for access by the second target peer storage device; and the second target peer storage device is configured to:
process third task input data using the third task compute configuration;
execute the second set of parallel tasks in parallel with the first target peer storage device executing the first set of parallel tasks; and
return third task output data.

5. The storage device of claim 4, wherein:
the processor is further configured to:
receive, from the first target peer storage device, the first task output data in the remotely accessible buffer memory; and
receive, from the second target peer storage device, the third task output data in the remotely accessible buffer memory; and
determining the host function result is further based on the third task output data.

6. The storage device of claim 1, wherein the processor is further configured to:
determine a first set of parallel tasks that includes the peer compute task;
determine a second set of parallel tasks that includes the master compute task; and
execute the second set of parallel tasks in parallel with the target peer storage device executing the first set of parallel tasks.

7. The storage device of claim 1, wherein:
the peer compute task is a first peer compute task in a first set of sequential tasks from the plurality of compute tasks associated with the remotely issued host function;
the processor is further configured to:
determine the first set of sequential tasks;
determine a second set of sequential tasks from the plurality of compute tasks associated with the remotely issued host function;
receive, from the target peer storage device, the first task output data in the remotely accessible buffer memory;
assign a second peer compute task in the second set of sequential tasks to the target peer storage device;
store a third task compute configuration associated with the second peer compute task in the remotely accessible buffer memory for access by the target peer storage device; and
receive, from the target peer storage device, third task output data in the remotely accessible buffer memory;
determining the host function result is further based on the third task output data; and
the target peer storage device is further configured to:
process, after returning the first task output data, third task input data using the third task compute configuration; and
return third task output data.

8. The storage device of claim 1, wherein the processor is further configured to:
assign at least one peer compute task of the plurality of compute tasks to each peer storage device of a number of peer storage devices in the plurality of peer storage devices; and
allocate, in the remotely accessible buffer memory, a peer compute task space for each peer storage device of the number of peer storage devices, wherein each peer compute task space is configured to include at least one compute task configuration space.

9. The storage device of claim 8, wherein each peer compute task space is further configured to include:
at least one input data space; and
at least one output data space.

10. The storage device of claim 1, wherein:
the storage medium comprises a non-volatile memory device for a first solid-state drive;
the remotely accessible buffer memory is at least a portion of a command memory buffer that is not allocated for host storage data transfer;
the target peer storage device:
includes a non-volatile memory device for a second solid-state drive; and
is further configured to store intermediate results of the peer compute task on the non-volatile memory device for the second solid-state drive; and
the storage device is configured to return, to a host system, the host function result.

11. A computer-based method, comprising:
receiving, by a master peer storage device and from a host system, a remotely issued host function request, wherein the master peer storage device is from a plurality of peer storage devices configured for peer communication over a network fabric;
determining, by the master peer storage device, a plurality of compute tasks associated with the remotely issued host function request;
determining, by the master peer storage device, a target peer storage device from the plurality of peer storage devices;
assigning, by the master peer storage device, a peer compute task from the plurality of compute tasks to the target peer storage device;
storage device, wherein the peer compute task space includes an assigned memory block in the remotely accessible buffer memory;
storing, by the master peer storage device, a first task compute configuration in a remotely accessible buffer memory for processing, by the target peer storage device, first task input data using the first task compute configuration;
executing, by the master peer storage device, a master compute task from the plurality of compute tasks using a second task compute configuration to process second task input data and return second task output data;
storing, by the master peer storage device, the second task output data;
receiving, by the master peer storage device and from the target peer storage device, first task output data;
determining, by the master peer storage device and based on the first task output data and the second task output data, a host function result; and
returning, by the master peer storage device and to the host system, the host function result.

12. The computer-based method of claim 11, further comprising:
storing the first task input data in the remotely accessible buffer memory for access by the target peer storage device.

13. The computer-based method of claim 11, further comprising:
storing, by the target peer storage device, the first task output data in the remotely accessible buffer memory.

14. The computer-based method of claim 11:
wherein:

the target peer storage device is a first target peer storage device from the plurality of peer storage devices;

the peer compute task is a first peer compute task in a first set of parallel tasks from the plurality of compute tasks associated with the remotely issued host function request; and determining the host function result is further based on third task output data; and further comprising:

determining, by the master peer storage device, the first set of parallel tasks;

determining, by the master peer storage device, a second set of parallel tasks from the plurality of compute tasks associated with the remotely issued host function request;

determining, by the master peer storage device, a second target peer storage device from the plurality of peer storage devices;

assigning, by the master peer storage device, a second peer compute task in the second set of parallel tasks to the second target peer storage device;

storing, by the master peer storage device, a third task compute configuration associated with the second peer compute task in the remotely accessible buffer memory for access by the second target peer storage device;

processing, by the second target peer storage device, third task input data using the third task compute configuration; and receiving, by the master peer storage device and from the second target peer storage device, the third task output data.

15. The computer-based method of claim 14, further comprising:

storing, in the remotely accessible buffer memory for access by the first target peer storage device, the first task input data;

storing, in the remotely accessible buffer memory for access by the second target peer storage device, the third task input data;

receiving, from the first target peer storage device, the first task output data in the remotely accessible buffer memory; and receiving, from the second target peer storage device, the third task output data in the remotely accessible buffer memory.

16. The computer-based method of claim 11, further comprising:

determining, by the master peer storage device, a first set of parallel tasks that includes the peer compute task;

determining, by the master peer storage device, a second set of parallel tasks that includes the master compute task; and executing, by the master peer storage device, the second set of parallel tasks in parallel with the target peer storage device executing the first set of parallel tasks.

17. The computer-based method of claim 11:

wherein:

the peer compute task is a first peer compute task in a first set of sequential tasks from the plurality of compute tasks associated with the remotely issued host function request; and determining the host function result is further based on third task output data; and further comprising:

determining, by the master peer storage device, the first set of sequential tasks;

determining, by the master peer storage device, a second set of sequential tasks from the plurality of compute tasks associated with the remotely issued host function request;

assigning, by the master peer storage device, a second peer compute task in the second set of sequential tasks to the target peer storage device;

storing, by the master peer storage device, a third task compute configuration associated with the second peer compute task in the remotely accessible buffer memory for access by the target peer storage device;

processing, by the target peer storage device and after returning the first task output data, third task input data using the third task compute configuration; and receiving, by the master peer storage device and from the target peer storage device, third task output data.

18. The computer-based method of claim 11, further comprising:

assigning at least one peer compute task of the plurality of compute tasks to each peer storage device of a number of peer storage devices in the plurality of peer storage devices; and allocating, in the remotely accessible buffer memory, a peer compute task space for each peer storage device of the number of peer storage devices, wherein each peer compute task space is configured to include at least one compute task configuration space.

19. The computer-based method of claim 18, wherein each peer compute task space is further configured to include:

at least one input data space; and at least one output data space.

20. A system, comprising:

a first storage device comprising:

a remotely accessible buffer memory configured for direct memory access by a plurality of peer storage devices over a network fabric;

means for receiving, from a host system, a remotely issued host function request;

means for determining a plurality of compute tasks associated with the remotely issued host function request;

means for determining a target peer storage device from the plurality of peer storage devices;

means for assigning a peer compute task from the plurality of compute tasks to the target peer storage device;

means for storing a first task compute configuration in the remotely accessible buffer memory for access by the target peer storage device;

means for executing a master compute task from the plurality of compute tasks using a second task compute configuration to process second task input data and return second task output data;

means for storing the second task output data;

means for receiving, from the target peer storage device, first task output data;

means for determining, based on the first task output data and the second task output data, a host function result; and means for returning, to the host system, the host function result; and the target peer storage device comprising:

means for accessing the first task compute configuration from the remotely accessible buffer memory using direct memory access over the network fabric; and
means for processing first task input data using the first task compute configuration.

* * * * *